(12) United States Patent
Kobayashi

(10) Patent No.: US 10,578,904 B2
(45) Date of Patent: Mar. 3, 2020

(54) FIELD SEQUENTIAL TYPE IMAGE DISPLAY APPARATUS AND IMAGE DISPLAY METHOD

(71) Applicant: SHARP KABUSHIKI KAISHA, Sakai, Osaka (JP)

(72) Inventor: Masamitsu Kobayashi, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days.

(21) Appl. No.: 16/173,558

(22) Filed: Oct. 29, 2018

(65) Prior Publication Data

US 2019/0129209 A1    May 2, 2019

(30) Foreign Application Priority Data

Oct. 30, 2017   (JP) ................. 2017-209395

(51) Int. Cl.
```
G09G 5/10       (2006.01)
G09G 3/36       (2006.01)
G02F 1/1334     (2006.01)
G09G 3/34       (2006.01)
C09K 11/07      (2006.01)
```
(52) U.S. Cl.
CPC ............ *G02F 1/1334* (2013.01); *C09K 11/07* (2013.01); *G09G 3/3406* (2013.01)

(58) Field of Classification Search
CPC .............................................. G09G 2310/0235
See application file for complete search history.

(56) References Cited

U.S. PATENT DOCUMENTS

2012/0176570 A1   7/2012   Yamazaki et al.
2017/0365233 A1*  12/2017  Ishihara .................... G09F 9/00

FOREIGN PATENT DOCUMENTS

JP       2012-155320 A     8/2012

* cited by examiner

*Primary Examiner* — Nan-Ying Yang
(74) *Attorney, Agent, or Firm* — ScienBiziP, P.C.

(57) ABSTRACT

In a field sequential type liquid crystal display apparatus in which each frame period is configured with first to fourth transparent subframe periods and blue, green, white, and blue subframe periods, a backlight unit is driven as follows. Light sources are in a turn-off state in the transparent subframe periods. In a second half of the blue, green, and red subframe periods, each of blue, green, and red light sources is in a turn-on state. In a second half of a white subframe, all light sources are in the turn-on state. Driving image data that corresponds to such a configuration of the frame period is generated from input image data, and a liquid crystal panel is driven based on the driving image data.

17 Claims, 14 Drawing Sheets

FIG. 18A
FIG. 18B
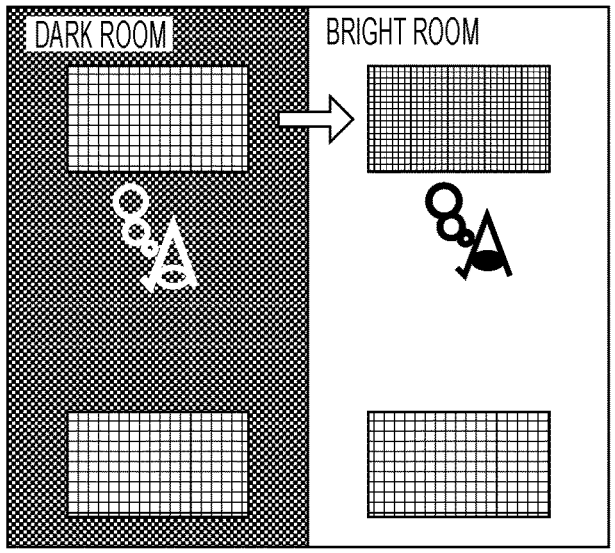
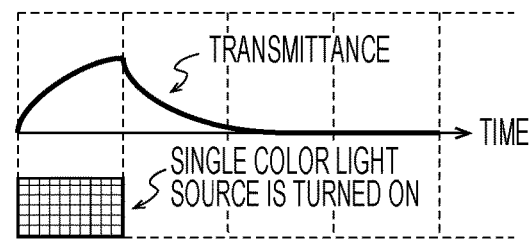
PANEL TRANSMITTANCE: APPROXIMATELY 1%
(IN ONE SUBFRAME RESPONSE)
FIG. 19A
FIG. 19B
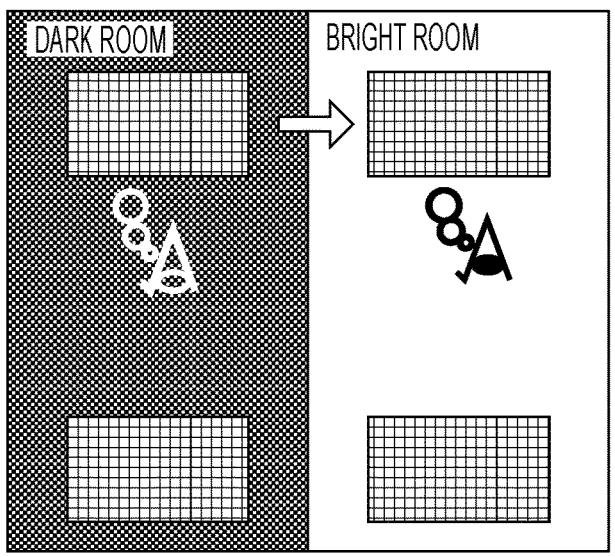
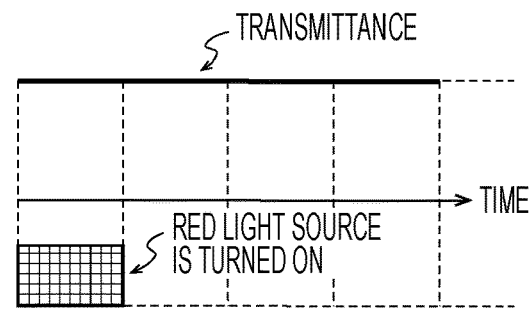
PANEL TRANSMITTANCE: APPROXIMATELY 20%
(WHEN ALL LIQUID CRYSTALS ARE OPEN)

FIELD SEQUENTIAL TYPE IMAGE DISPLAY APPARATUS AND IMAGE DISPLAY METHOD

BACKGROUND

1. Field

The present disclosure relates to a field sequential type image display apparatus and an image display method that enable transparent display.

2. Description of the Related Art

In the related art, a field sequential type image display apparatus that displays a plurality of subframes in one frame period is known. For example, a typical field sequential type image display apparatus includes backlight units including red, green, and blue light sources and displays red, green, and blue subframes in one frame period. When the red subframe is displayed, a display panel is driven based on red image data, and the red light source emits light. Next, the green subframe and the blue subframe are displayed in a similar manner. Three subframes displayed in a time division manner are combined because of an afterimage phenomenon on a retina of an observer and are recognized as one color image by the observer.

In the field sequential type display apparatus described above, a color image may be displayed without using color filters. In addition, since color filters are not used, transparent display is enabled.

In addition, in the field sequential type image display apparatus, when a sight line of the observer moves within a display screen, colors of each subframe may be separately seen by the observer (this phenomenon is called "color breakup"). Therefore, an image display apparatus that displays a white subframe in addition to the red, green, and blue subframes in order to reduce color breakup is known.

Related to a display apparatus disclosed in the present application, Japanese Unexamined Patent Application Publication No. 2012-155320 discloses a display apparatus that has a see-through function and in which a first display unit including a double-sided emission type light emitting element, a second display unit including a light scattering liquid crystal layer, and a shutter shaped light blocking unit between the first display unit and the second display unit are disposed. The first display unit has transmission properties in a case where at least the double-sided emission type light emitting element is in a non-light emission state, and the second display unit has transmission properties in a case where at least the light scattering liquid crystal layer is in a transmission state (paragraph [0033]). In this display apparatus, a negative display mode for the background of the first display unit, a positive display mode for the background of the first display unit, and a see-through display mode for the background of the first display unit may be implemented as a display mode recognizable from the first display unit by individually switching the states of the first display unit, the second display unit, and the light blocking unit (paragraphs [0032] and [0070] to [0083]).

In a field sequential type display apparatus in the related art in which a light guide plate for irradiating a rear surface of a display panel with light (hereinafter, referred to as "rear surface light") like a liquid crystal display apparatus, positive display, negative display, and transparent display may not be performed at the same time in the same screen. The reason is that in the display apparatus in the related art, a background of the display panel may not be recognized through the light guide plate in a case where a light source of the rear surface light is not set to be in a turn-off state. The "positive display" includes not only display of a white image but also display of a color image.

Meanwhile, in the display apparatus disclosed in Japanese Unexamined Patent Application Publication No. 2012-155320, as described above, a positive display mode, a negative display mode, and a see-through display (transparent display) mode may be implemented as display modes that may be recognized from the first display unit. In addition, these three display modes may be separately used for each pixel (paragraph [0084]). According to the display apparatus (hereinafter, referred to as an "example in the related art") having such a configuration, positive display, negative display, and transparent display may be performed at the same time within the same screen.

However, in the example in the related art, a part corresponding to a display panel (liquid crystal panel) in the field sequential type display apparatus is substantially configured with a plurality of panels (the first display unit, the second display unit, and the light blocking unit). Thus, cost increases. In addition, in the example in the related art, the plurality of panels including a number of pixels are overlaid with each other. Thus, moire is easily caused. Furthermore, in the example in the related art, the plurality of panels are to be synchronously driven. Thus, drive circuits and control circuits in the display apparatus are complicated.

It is desirable to provide a display apparatus that performs positive display, negative display, and transparent display at the same time within the same screen without complicated configurations of display panels and circuits.

SUMMARY

According to an aspect of the disclosure, there is provided a field sequential type image display apparatus in which a plurality of subframe periods are included in each frame period, the apparatus including a light source section, a light modulating unit as a display panel that transmits light from the light source section, a light source section drive circuit that drives the light source section, a light modulating unit drive circuit that controls a transmittance in the light modulating unit, and an image data converting unit that receives input image data and generates driving image data corresponding to the plurality of subframe periods from the input image data, in which each frame period includes at least one transparent subframe period and at least one display color subframe period, the light source section is a planar lighting device that emits light from a principal surface and irradiates a rear surface of the light modulating unit with the light, and at a time of a turn-off state, the light source section is in a transparent state where light incident from the principal surface is transmitted, the light source section drive circuit drives the light source section such that the light source section is in the turn-off state in the transparent subframe period and is in a turn-on state in the display color subframe period, the image data converting unit generates transmittance control data as the driving image data based on the input image data, the transmittance control data causing the transmittance of light in an area of the light modulating unit for performing transparent display to be maximum in at least one transparent subframe period, causing the transmittance of light in an area of the light modulating unit for performing negative display to be minimum in the transparent subframe period and the display color subframe period, and causing the transmittance of light in an area of the light modulating unit for displaying a white or color image to a value corresponding to the image in the display color subframe period, and the light modulating unit drive circuit controls the transmittance in the light modulating unit by driving the light modulating unit based on the driving image data.

According to another aspect of the disclosure, there is provided an image display method for displaying an image in an image display apparatus including a light source section and a light modulating unit as a display panel transmitting light from the light source section, based on a field sequential type method in which a plurality of subframe periods are included in each frame period, the image display method including light source section driving of driving the light source section, light modulating unit driving of controlling a transmittance in the light modulating unit, and image data converting of receiving input image data and generating driving image data corresponding to the plurality of subframe periods from the input image data, in which each frame period includes at least one transparent subframe period and at least one display color subframe period, the light source section is a planar lighting device that emits light from a principal surface and irradiates a rear surface of the light modulating unit with the light, and at a time of a turn-off state, the light source section is in a transparent state where light incident from the principal surface is transmitted, in the light source section driving, the light source section is driven such that the light source section is in the turn-off state in the transparent subframe period and is in a turn-on state in the display color subframe period, in the image data converting, transmittance control data is generated as the driving image data based on the input image data, the transmittance control data causing the transmittance of light in an area of the light modulating unit for performing transparent display to be maximum in at least one transparent subframe period, causing the transmittance of light in an area of the light modulating unit for performing negative display to be minimum in the transparent subframe period and the display color subframe period, and causing the transmittance of light in an area of the light modulating unit for displaying a white or color image to a value corresponding to the image in the display color subframe period, and in the light modulating unit driving, the transmittance in the light modulating unit is controlled by driving the light modulating unit based on the driving image data.

BRIEF DESCRIPTION OF THE DRAWINGS

FIG. 8 is a timing chart and a waveform diagram (A to G) for describing a display operation in a case where the backlight unit of the image display apparatus according to the first embodiment is turned on;

FIG. 10 is a timing chart and a waveform diagram (A to G) for describing a display operation in a case where the backlight unit of the image display apparatus according to the first embodiment is not turned on;

FIGS. 18A and 18B are diagrams for describing an object in the image display apparatus in the related art;

FIGS. 19A and 19B are diagrams for describing a method for achieving the object in the image display apparatus in the related art;

DESCRIPTION OF THE EMBODIMENTS

Hereinafter, image display apparatuses according to each embodiment will be described with reference to the drawings. Below, one frame period is a period for refreshing (rewriting a display image) for one screen, and the length of "one frame period" is the length of one frame period (16.67 ms) in a general display apparatus of which the refresh rate is 60 Hz. However, the present disclosure is not limited thereto. It is to be pointed out that a "calculation" included in the following description includes not only "obtaining a calculation result using a calculator" but also "storing a calculation result in advance in a table and obtaining the calculation result by looking up the table".

1. First Embodiment

1.1 Overall Configuration

Figure 1:
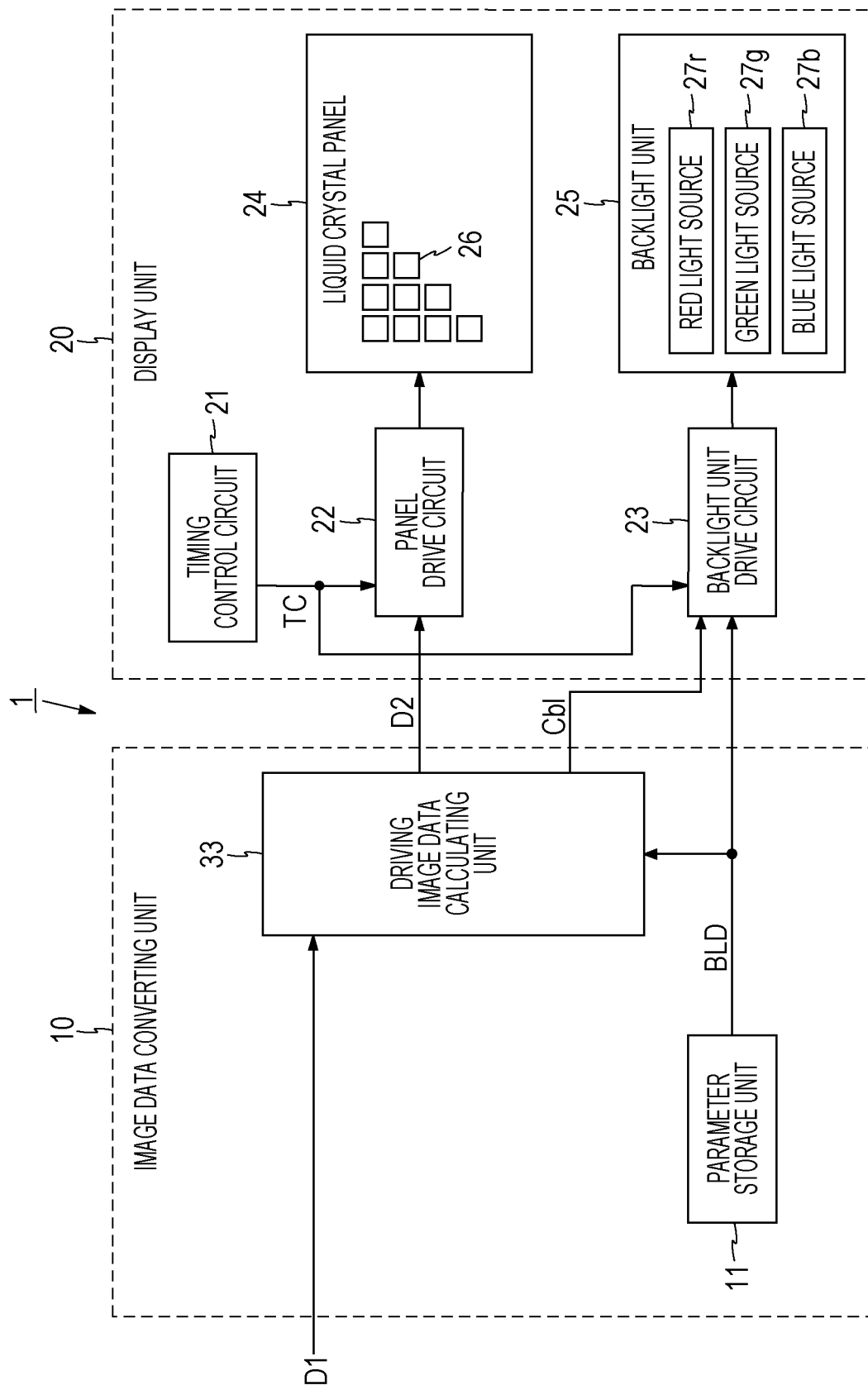
FIG. 1 is a block diagram illustrating a configuration of an image display apparatus according to a first embodiment.

FIG. 1 is a block diagram illustrating a configuration of an image display apparatus according to a first embodiment. An image display apparatus 1 illustrated in FIG. 1 includes an image data converting unit 10 and a display unit 20. The image data converting unit 10 includes a parameter storage unit 11 and a driving image data calculating unit 33. The display unit 20 includes a liquid crystal panel 24 as a light modulating unit; a backlight unit 25 as a light source section including a red light source 27r, a green light source 27g, a blue light source 27b, and a light guide plate; a timing control circuit 21; a panel drive circuit 22 as a light modulating unit drive circuit; and a backlight unit drive circuit 23 as a light source section drive circuit.

Figure 4:
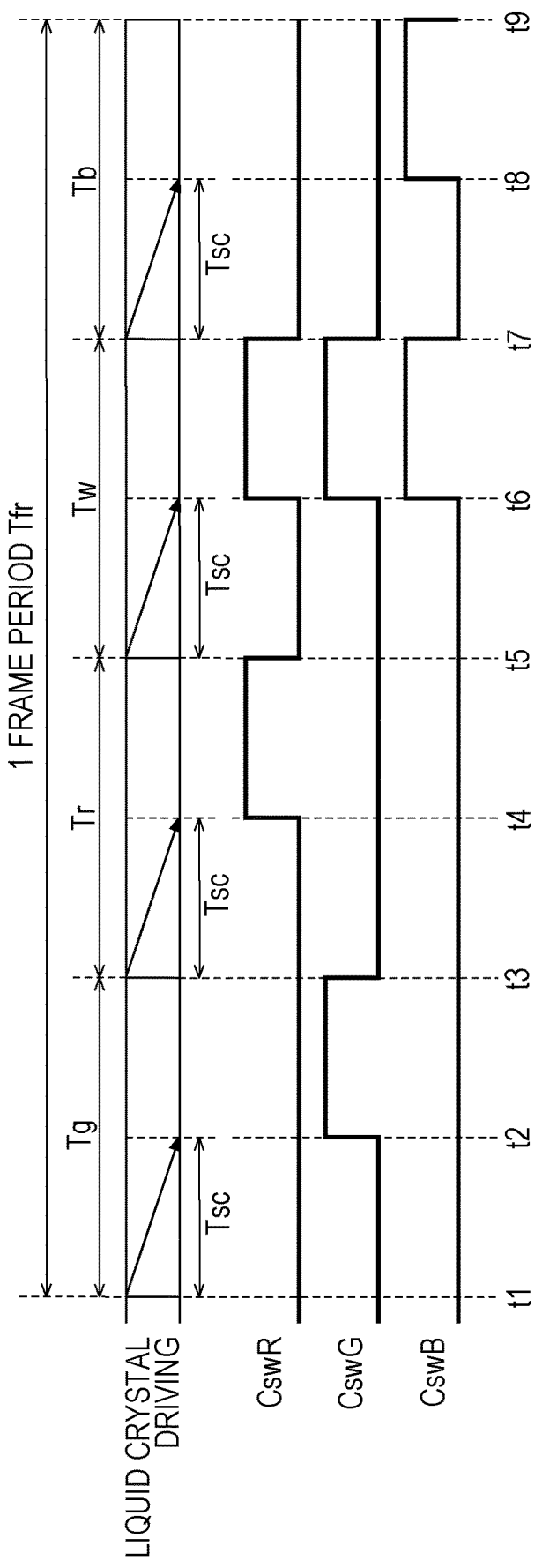
FIG. 4 is a timing chart for describing an operation of a backlight unit in an image display apparatus in the related art.

The image display apparatus 1 is a field sequential type liquid crystal display apparatus. The image display apparatus 1 divides one frame period into a plurality of subframe periods and displays a subframe of a different color in each subframe period. In a field sequential type image display apparatus in the related art (hereinafter, simply referred to as an "image display apparatus in the related art"), for example, as illustrated in FIG. 4, one frame period is divided into four subframe periods, and green, red, white, and blue subframes are respectively displayed in first to fourth subframe periods. In the image display apparatus in the related art, the white subframe is a common color subframe. In either the image display apparatus in the related art or the image display apparatus 1 according to the present embodiment, a "color" in each subframe refers to a light source color, and the display unit 20 of the image display apparatus 1 is configured to display "white color" having a desired color temperature in a case where "1" (maximum value) is provided for all of red, green, and blue as light source driving data for driving the backlight unit 25 (the same applies to other embodiments described below).

The image display apparatus 1 according to the present embodiment divides one frame period into a plurality of subframe periods and displays, in each subframe period, any subframe of a subframe (hereinafter, referred to as a "display color subframe") of a color determined by a light source in a turn-on state or a subframe (hereinafter, referred to as a "transparent subframe") in which the background is seen through. In a period in which the transparent subframe is displayed, each of the light sources 27r, 27g, and 27b is in a turn-off state, and the light guide plate described below is in a transparent state. In the present embodiment, one frame period Tfr includes eight subframe periods Ts1 to Ts8. The transparent subframe is displayed in at least one subframe period, and the display color subframe is displayed in the remaining subframe periods. However, the number of subframe periods included in one frame period Tfr is not limited to eight. A configuration in which, for example, red, green, and blue subframes are set as the display color subframe is considered. In addition, for example, for the purpose of reducing color breakup, a white subframe as common color may be further set in addition to the red, green, and blue subframes, and another color instead of white may be used as the common color. Furthermore, considering the optical response characteristics of the liquid crystal panel 24, it is desirable that a plurality of subframe periods in which the display color subframe is displayed in one frame period Tfr are adjacent to each other. In a case where a plurality of subframe periods in which the transparent subframe is displayed are included in one frame period Tfr, it is desirable that the plurality of subframe periods are also adjacent to each other. In a case where a single color image is displayed, only a subframe of any one color of white, red, green, blue, or another color may be set as the display color subframe.

Information that indicates, for each of the eight subframe periods Ts1 to Ts8 included in one frame period Tfr, which color is set or whether or not a light source is turned off (transparent) is stored in the parameter storage unit 11 and is input as a subframe color indication signal BLD into the driving image data calculating unit 33 and the backlight unit drive circuit 23. It is desirable that the parameter storage unit 11 is implemented as a register in which data to be stored may be set from the outside. Below, in the present embodiment illustrated in FIG. 5 and part (G) of FIG. 8, the first to fourth subframe periods Ts1 to Ts4 among the eight subframe periods Ts1 to Ts8 in one frame period Tfr are respectively first to fourth transparent subframe periods Tt1 to Tt4. In each transparent subframe period Ttk, the transparent subframe is displayed (k=1 to 4). The fifth subframe period Ts5 is a blue subframe period Tb in which the blue subframe is displayed. The sixth subframe period Ts6 is a green subframe period Tg in which the green subframe is displayed. The seventh subframe period Ts7 is a white subframe period Tw in which the white subframe is displayed. The eighth subframe period Ts8 is a red subframe period Tr in which the red subframe is displayed. Hereinafter, a period configured with the first to fourth transparent subframe periods Tt1 to Tt4 will be called a "transparent display subframe period Tt", and a period configured with the blue, green, white, and red subframe periods Tb, Tg, Tw, and Tr will be called a "typical display subframe period Tn" (refer to FIG. 5).

In the image display apparatus 1 according to the present embodiment, input image data D1 that includes red, green, blue, and transparent color image data is input. The image data converting unit 10 obtains driving image data D2 corresponding to the transparent, green, red, white, and blue subframes from the input image data D1. Hereinafter, this process will be referred to as an "image data conversion process", and the driving image data D2 corresponding to the transparent, green, red, white, and blue subframes will be respectively referred to as "transparent, green, red, white, and blue image data included in the driving image data D2". The display unit 20 displays the transparent, green, red, white, and blue subframes in one frame period Tfr based on the driving image data D2. The driving image data D2 determines the transmittance of light for each pixel in the liquid crystal panel 24 in the display unit 20 and thus, corresponds to transmittance control data.

The image data converting unit 10 may be implemented by software using a microcomputer (hereinafter, abbreviated to a "micro") including a central calculation processing device (CPU) and a memory, by causing the micro to execute a predetermined program. Instead, part or the whole image data converting unit 10 may be implemented as dedicated hardware (typically, an application specific integrated circuit that is designed for a dedicated purpose).

The timing control circuit 21 outputs a timing control signal TC to the panel drive circuit 22 and the backlight unit drive circuit 23. The panel drive circuit 22 drives the liquid crystal panel 24 based on the timing control signal TC and the driving image data D2. The backlight unit drive circuit 23 drives the backlight unit 25 based on the timing control signal TC, the subframe color indication signal BLD from the parameter storage unit 11, and a turn-on control signal Cb1, described below, generated by the driving image data calculating unit 33. The liquid crystal panel 24 includes a plurality of pixels 26 that are arranged in a two-dimensional form. As described above, the backlight unit 25 includes the red light source 27*r*, the green light source 27*g*, the blue light source 27*b* (hereinafter, the light sources 27*r*, 27*g*, and 27*b* will be collectively referred to as a "light source 27"), and the light guide plate. The backlight unit 25 may include a white light source. For example, a light emitting diode (LED) is used as the light source 27. The turn-on control signal Cb1 is a signal for specifying a light source to be turned on among the light sources 27*r*, 27*g*, and 27*b* (details will be described below).

Figure 2:
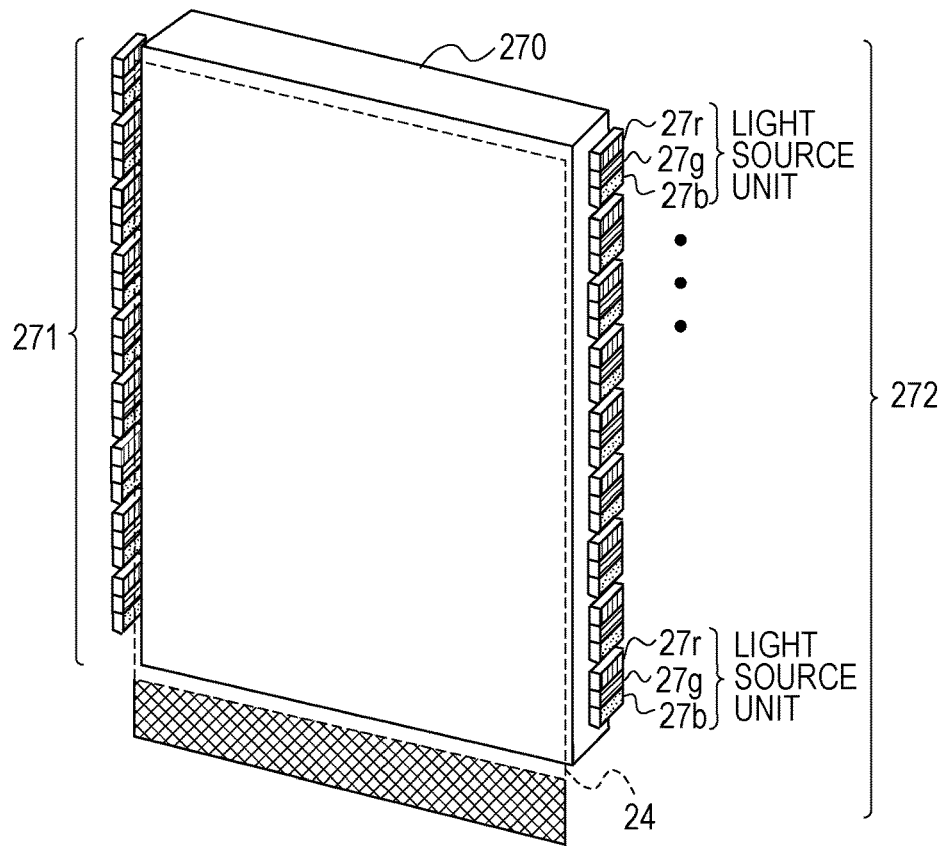
FIG. 2 is a perspective view schematically illustrating a configuration example of a backlight unit in the first embodiment.

FIG. 2 is a perspective view schematically illustrating a configuration example of the backlight unit 25. The backlight unit 25 according to the present configuration example includes a light guide plate 270 and edge light units 271 and 272 (such a backlight unit is called an "edge type backlight unit"). The light guide plate 270 is arranged to face the rear surface of the liquid crystal panel 24. The edge light units 271 and 272 are arranged on the side surfaces of the light guide plate 270 that face each other. Each of the edge light units 271 and 272 is configured by linearly arranging a plurality of sets of light source units, each set of which includes the red LED 27*r* as the red light source, the green LED 27*g* as the green light source, and the blue LED 27*b* as the blue light source. The backlight unit 25 functions as a planar lighting device that irradiates the rear surface of the liquid crystal panel 24 with light because of light from each of the light emitting diodes 27*r*, 27*g*, and 27*b* incident on the side surfaces, which face each other, of the light guide plate 270 and emitted from the principal surface of the light guide plate 270. The light guide plate 270 is in the transparent state when all of the light emitting diodes 27*r*, 27*g*, and 27*b* in each light source unit are in the turn-off state. In the configuration illustrated in FIG. 2, edge light units are arranged on two side surfaces that face each other among four side surfaces in the light guide plate 270. Instead, any of a configuration in which an edge light unit is arranged on only one side surface, a configuration in which edge light units are arranged on three side surfaces, or a configuration in which edge light units are arranged on all of the four side surfaces may be used. That is, light from the edge light unit may be incident on either only one side surface, two side surfaces, three side surfaces, or all of the four side surfaces among the side surfaces of the light guide plate 270.

Next, details of driving of the backlight unit 25 as the light source section will be described along with driving of the liquid crystal panel 24 as the light modulating unit with reference to FIG. 3, FIG. 4, and FIG. 5. Below, the backlight unit 25 is configured using light emitting diodes (LED). However, the configuration of the backlight unit is not limited thereto (the same applies to other embodiments).

Figure 3:
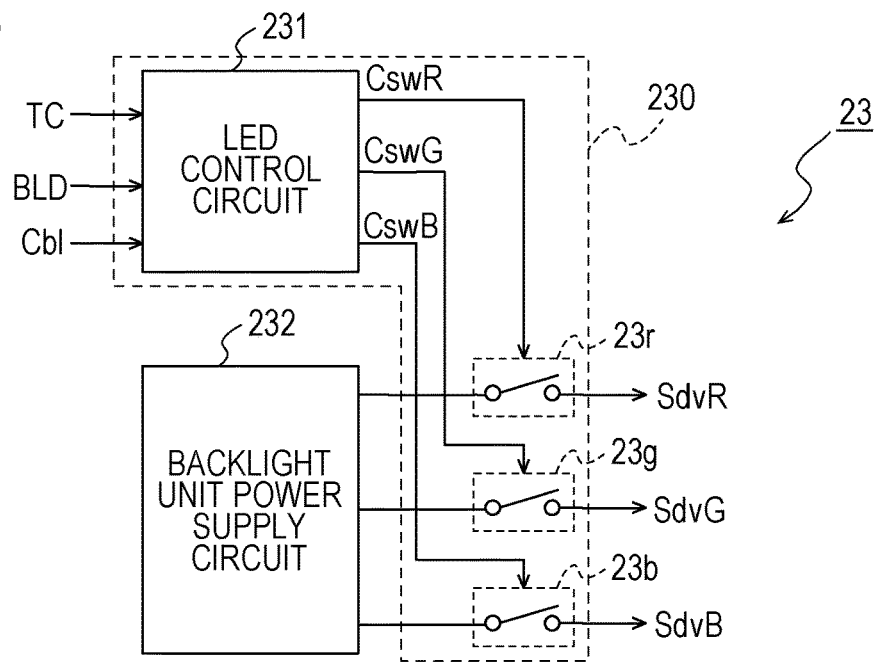
FIG. 3 is a block diagram illustrating a configuration of a backlight unit drive circuit in the first embodiment.

FIG. 3 is a block diagram illustrating a configuration of the backlight unit drive circuit 23. The backlight unit drive circuit 23 is configured with a turn-on control circuit 230 and a backlight unit power supply circuit 232. As illustrated in FIG. 3, the turn-on control circuit 230 includes an LED control circuit 231, a red light source switch 23*r*, a green light source switch 23*g*, and a blue light source switch 23*b*. The LED control circuit 231 generates and provides a red light source control signal CswR, a green light source control signal CswG, and a blue light source control signal CswB respectively to the red light source switch 23*r*, the green light source switch 23*g*, and the blue light source switch 23*b* based on the timing control signal TC from the timing control circuit 21, the subframe color indication signal BLD from the parameter storage unit 11, and the turn-on control signal Cb1, described below, generated by the driving image data calculating unit 33. The red light source switch 23*r* is in an ON state when the red light source control signal CswR is at a high level (H level), and is in an OFF state when the red light source control signal CswR is at a low level (L level). The green light source switch 23*g* is in the ON state when the green light source control signal CswG is at the H level, and is in the OFF state when the green light source control signal CswG is at the L level. The blue light source switch 23*b* is in the ON state when the blue light source control signal CswB is at the H level, and is in the OFF state when the blue light source control signal CswB is at the L level.

The red light source 27*r*, the green light source 27*g*, and the blue light source 27*b* (in each light source unit) included in the backlight unit 25 are connected to the backlight unit power supply circuit 232 through the red light source switch 23*r*, the green light source switch 23*g*, and the blue light source switch 23*b*, respectively. Accordingly, the red light source 27*r*, the green light source 27*g*, and the blue light source 27*b* are respectively provided with a red light source drive signal SdvR, a green light source drive signal SdvG, and a blue light source drive signal SdvB as driving signals. Therefore, the red light source 27*r* is in the turn-on state when the red light source control signal CswR is at the H level, and is in the turn-off state when the red light source control signal CswR is at the L level. The green light source 27*g* is in the turn-on state when the green light source control signal CswG is at the H level, and is in the turn-off state when the green light source control signal CswG is at the L level. The blue light source 27*b* is in the turn-on state when the blue light source control signal CswB is at the H level, and is in the turn-off state when the blue light source control signal CswB is at the L level.

FIG. 4 is a timing chart for describing driving of a backlight unit in the image display apparatus in the related art. The image display apparatus in the related art also includes the similar backlight unit drive circuit to the backlight unit drive circuit 23 configured as illustrated in FIG. 3. Driving of the backlight unit in the image display apparatus in the related art will be described as a comparative example before a description of driving of the backlight unit in the present embodiment. Below, in the configuration of the image display apparatus in the related art, the same or corresponding parts as the image display apparatus 1 according to the present embodiment are designated by the same reference signs.

As illustrated in FIG. 4, in the image display apparatus in the related art, the first half of each of the subframe periods Tg, Tr, Tw, and Tb is a turn-off period Toff in which the liquid crystal panel 24 is not irradiated with light from the backlight unit 25, and the second half is a turn-on period Ton in which the liquid crystal panel 24 is irradiated with light from the backlight unit 25. In a scanning period Tsc that corresponds to the turn-off period Toff in each subframe period Tx (x=g, r, w, and b), the panel drive circuit 22 scans the liquid crystal panel 24 and writes each pixel data constituting the driving image data D2 into the liquid crystal panel 24. The backlight unit drive circuit 23 selectively drives the red light source 27*r*, the green light source 27*g*, and the blue light source 27*b* in the backlight unit 25 in accordance with the red light source control signal CswR, the green light source control signal CswG, and the blue light source control signal CswB. As is perceived from the waveforms of the light source control signals CswR, CswG, and CswB illustrated in FIG. 4, only the green light source 27g is turned on in the green subframe period Tg. In the red subframe period Tr, only the red light source 27r is turned on. In the blue subframe period Tb, only the blue light source 27b is turned on. In the white subframe period Tw, the red light source 27r, the green light source 27g, and the blue light source 27b are turned on at the same time. Accordingly, the rear surface of the liquid crystal panel 24 is irradiated with white light, blue light, green light, and red light in the white subframe period Tw, the blue subframe period Tb, the green subframe period Tg, and the red subframe period Tr, respectively.

By driving the backlight unit 25 along with driving of the liquid crystal panel 24 (writing of pixel data into the liquid crystal panel 24), display of the green subframe (green image) in the green subframe period Tg, display of the red subframe (red image) in the red subframe period Tr, display of the white subframe (white image) in the white subframe period Tw, and display of the blue subframe (blue image) in the blue subframe period Tb are performed based on the input image data D1. A color image produced by temporal additive color mixing is displayed on the liquid crystal panel 24. Details of such a display operation in the image display apparatus in the related art will be described below (refer to FIG. 6 and FIG. 7).

Figure 5:
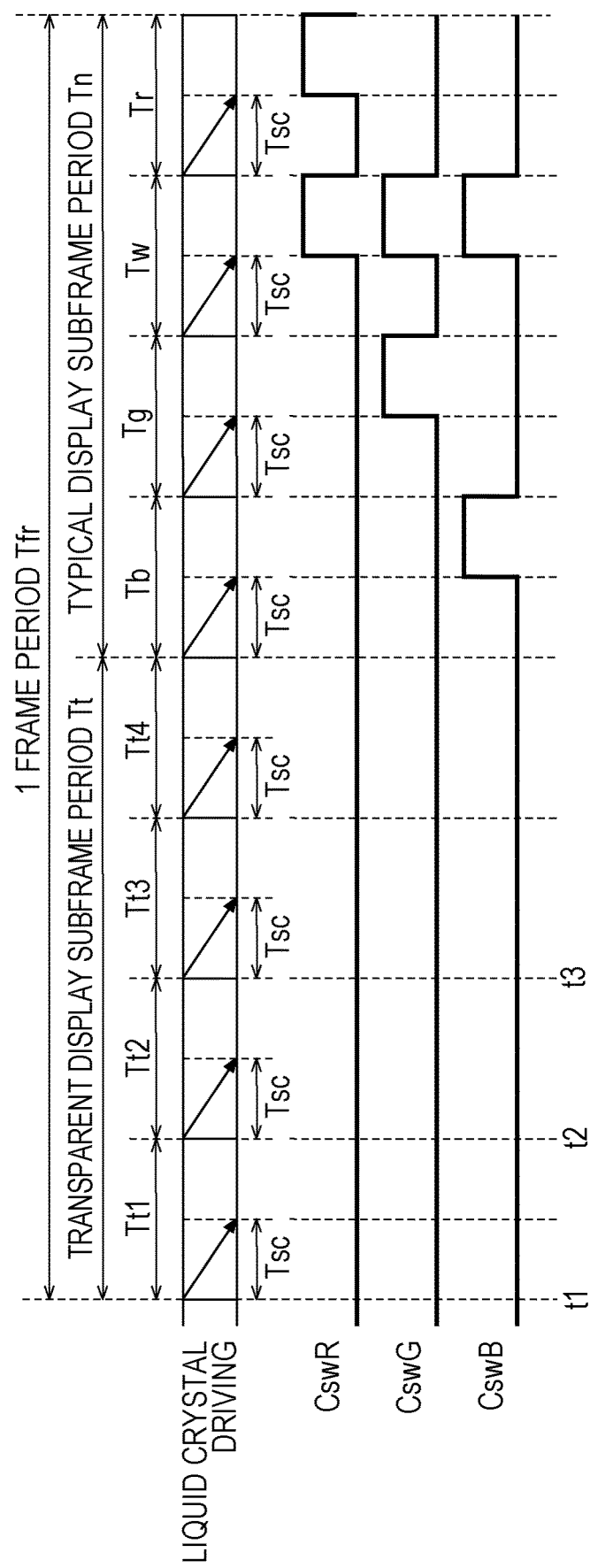
FIG. 5 is a timing chart for describing an operation of the backlight unit in the first embodiment.

FIG. 5 is a timing chart for describing driving of the backlight unit 25 in the present embodiment. As illustrated in FIG. 5, in the present embodiment, one frame period Tfr is configured with the transparent display subframe period Tt and the typical display subframe period Tn. As described above, the transparent display subframe period Tt includes the first to fourth transparent subframe periods Tt1 to Tt4, and the first half of each transparent subframe period Ttk corresponds to the scanning period Tsc (k=1 to 4). In the first to fourth transparent subframe periods Tt1 to Tt4, the light sources 27r, 27g, and 27b are in the turn-off state. In the scanning period Tsc in each transparent subframe period Ttk, the panel drive circuit 22 scans the liquid crystal panel 24 and successively writes each pixel data constituting the transparent color image data in the driving image data D2 into the liquid crystal panel 24. In a case where the transparent color image data configured with pixel data to be written into the liquid crystal panel 24 is the same among the first to fourth transparent subframe periods Tt1 to Tt4, each pixel data may not be written into the liquid crystal panel 24 in the second to fourth transparent subframe periods Tt2 to Tt4.

In addition, as illustrated in FIG. 5, the typical display subframe period Tn includes the blue subframe period Tb, the green subframe period Tg, the white subframe period Tw, and the red subframe period Tr in this order. The first half of each of the subframe periods (periods in which the display color subframe is displayed; hereinafter, collectively referred to as a "display color subframe period") Tb, Tg, Tw, and Tr corresponds to the scanning period Tsc. In the first half of each of the display color subframe periods Tb, Tg, Tw, and Tr, the light sources 27r, 27g, and 27b are in the turn-off state. In the scanning period Tsc corresponding to the first half of each of the display color subframe periods Tb, Tg, Tw, and Tr, the panel drive circuit 22 scans the liquid crystal panel 24 and successively writes each pixel data constituting the corresponding color image data in the driving image data D2 into the liquid crystal panel 24. That is, in the scanning period Tsc in the blue subframe period Tb, the panel drive circuit 22 writes each pixel data constituting the blue image data into the liquid crystal panel 24. In the scanning period Tsc in the green subframe period Tg, the panel drive circuit 22 writes each pixel data constituting the green image data into the liquid crystal panel 24. In the scanning period Tsc in the white subframe period Tw, the panel drive circuit 22 writes each pixel data constituting the white image data into the liquid crystal panel 24. In the scanning period Tsc in the red subframe period Tr, the panel drive circuit 22 writes each pixel data constituting the red image data into the liquid crystal panel 24.

In the second half of each of the display color subframe periods Tb, Tg, Tw, and Tr, the backlight unit drive circuit 23 drives the light sources 27r, 27g, and 27b in the backlight unit 25 such that the light source color of a corresponding color is acquired. That is, the backlight unit drive circuit 23 drives the light sources 27r, 27g, and 27b as follows. In the second half of the blue subframe period Tb, only the blue light source 27b is in the turn-on state. In the second half of the green subframe period Tg, only the green light source 27g is in the turn-on state. In the second half of the white subframe period Tw, all of the red, green, and blue light sources 27r, 27g, and 27b are in the turn-on state. In the second half of the red subframe period Tr, only the red light source 27r is in the turn-on state.

By driving the backlight unit 25 along with driving of the liquid crystal panel 24 (writing of pixel data into the liquid crystal panel 24), display of the transparent subframe (transparent color image) in each of the transparent subframe periods Tt1 to Tt4, display of the blue subframe (blue image) in the blue subframe period Tb, display of the green subframe (green image) in the green subframe period Tg, display of the white subframe (white image) in the white subframe period Tw, and display of the red subframe (red image) in the red subframe period Tr are performed based on the input image data D1. A color image produced by temporal additive color mixing and a transparent color image are displayed on the liquid crystal panel 24. The display of the transparent color image means that a transparent area is formed in the liquid crystal panel 24. According to the present embodiment, positive display (color image display), negative display, and transparent display may be performed at the same time within the same screen (hereinafter, referred to as "same time same screen three state display"). Details of such a display operation in the present embodiment will be described below (refer to FIG. 8 and FIG. 9).

1.2 Display Operation

Figure 6:
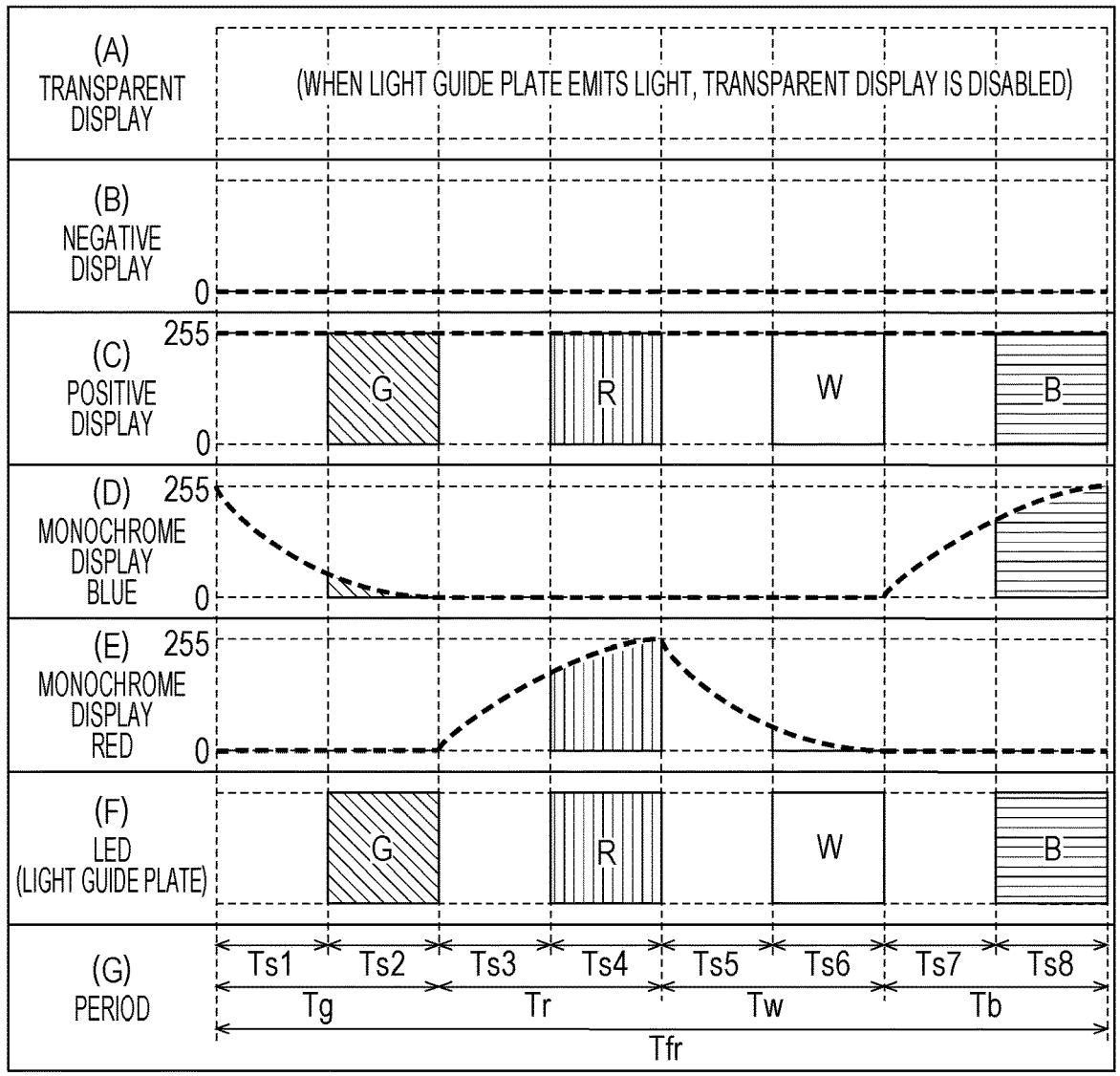
FIG. 6 is a timing chart and a waveform diagram (A to G) for describing the operation of the image display apparatus in the related art.
Figure 7:
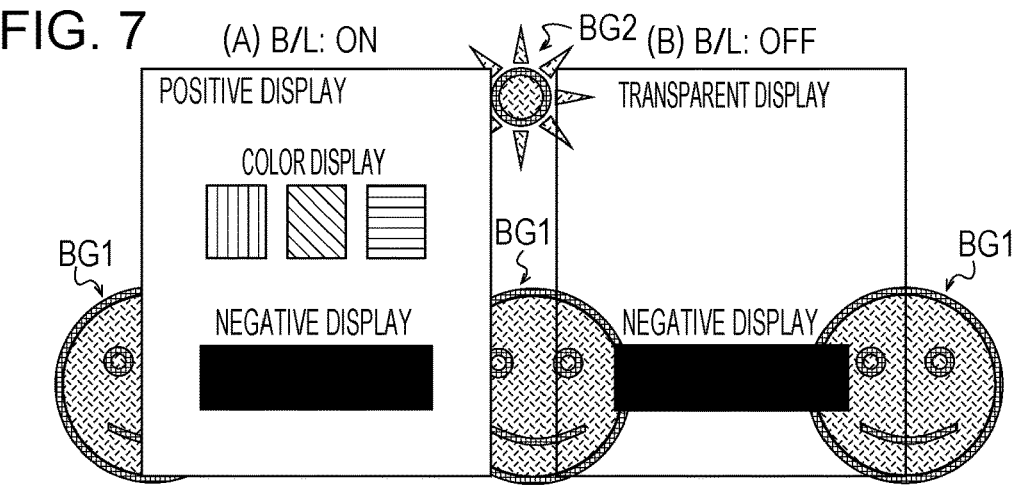
FIG. 7 is a schematic diagram (A and B) illustrating a display example produced by the image display apparatus in the related art.

FIG. 6 is a timing chart and a waveform diagram for describing a display operation of the image display apparatus in the related art in which the backlight unit 25 is driven as illustrated in FIG. 4. FIG. 7 is a schematic diagram illustrating a display example produced by the image display apparatus in the related art. In FIG. 6, a rectangle hatched with diagonal lines denotes intensity and the light emission period of green (G) light. A rectangle hatched with vertical lines denotes intensity and the light emission period of red (R) light. A rectangle hatched with lateral lines denotes intensity and the light emission period of blue (B) light. A rectangle that is not hatched denotes intensity and the light emission period of white (W) light. A bold dotted line denotes the optical response (temporal change in transmittance) of the liquid crystal (transmittance is denoted by a value corresponding to a gray scale value of 0 to 255). In FIG. 6, a time axis (not illustrated) extends in the horizontal direction (lateral direction) in FIG. 6. In addition, in FIG. 7, a rectangle hatched with vertical lines denotes a red area, that is, a red (R) image, in the display image. A rectangle hatched with diagonal lines denotes a green area, that is, a green (G) image, in the display image. A rectangle hatched with lateral lines denotes a blue area, that is, a blue (B) image, in the display image. Figures BG1 and BG2 that are hatched with diagonal dotted lines in two directions and hatched with a lattice form denote a person or an object behind the liquid crystal panel 24. The method of representation in FIG. 6 and FIG. 7 is also employed in FIG. 8 to FIG. 16 and FIG. 20 to FIG. 23 described below.

In a case where the light source 27 (light sources 27r, 27g, and 27b) of the backlight (B/L) unit 25 is turned on, negative display, positive display, and monochrome display of red, blue, or the like may be performed as illustrated in part (A) of FIG. 7 by controlling the transmittance of the liquid crystal panel for each pixel by driving the liquid crystal panel 24 as illustrated in part (B) to part (E) of FIG. 6. In a case where the light source 27 of the backlight (B/L) unit 25 is turned on, the light guide plate 270 disposed on the rear surface side of the liquid crystal panel 24 emits light. Thus, the backgrounds (a person or an object behind) BG1 and BG2 may not be recognized through the liquid crystal panel 24. Meanwhile, in a case where the light source 27 of the backlight (B/L) unit 25 is not turned on, the light guide plate 270 is in the transparent state. Thus, transparent display and negative display may be performed as illustrated in part (B) of FIG. 7 by controlling the transmittance of the liquid crystal panel for each pixel by driving the liquid crystal panel 24. However, in a case where the light source 27 of the backlight (B/L) unit 25 is not turned on, positive display, color image display, and monochrome display (collectively referred to as "positive display" as described above) may not be performed. Accordingly, in the image display apparatus in the related art, positive display, negative display, and transparent display may not be performed at the same time within the same screen. The "monochrome display" refers to display of an image of any one color of the light sources 27r, 27g, and 27b in the backlight unit 25.

Figure 8:
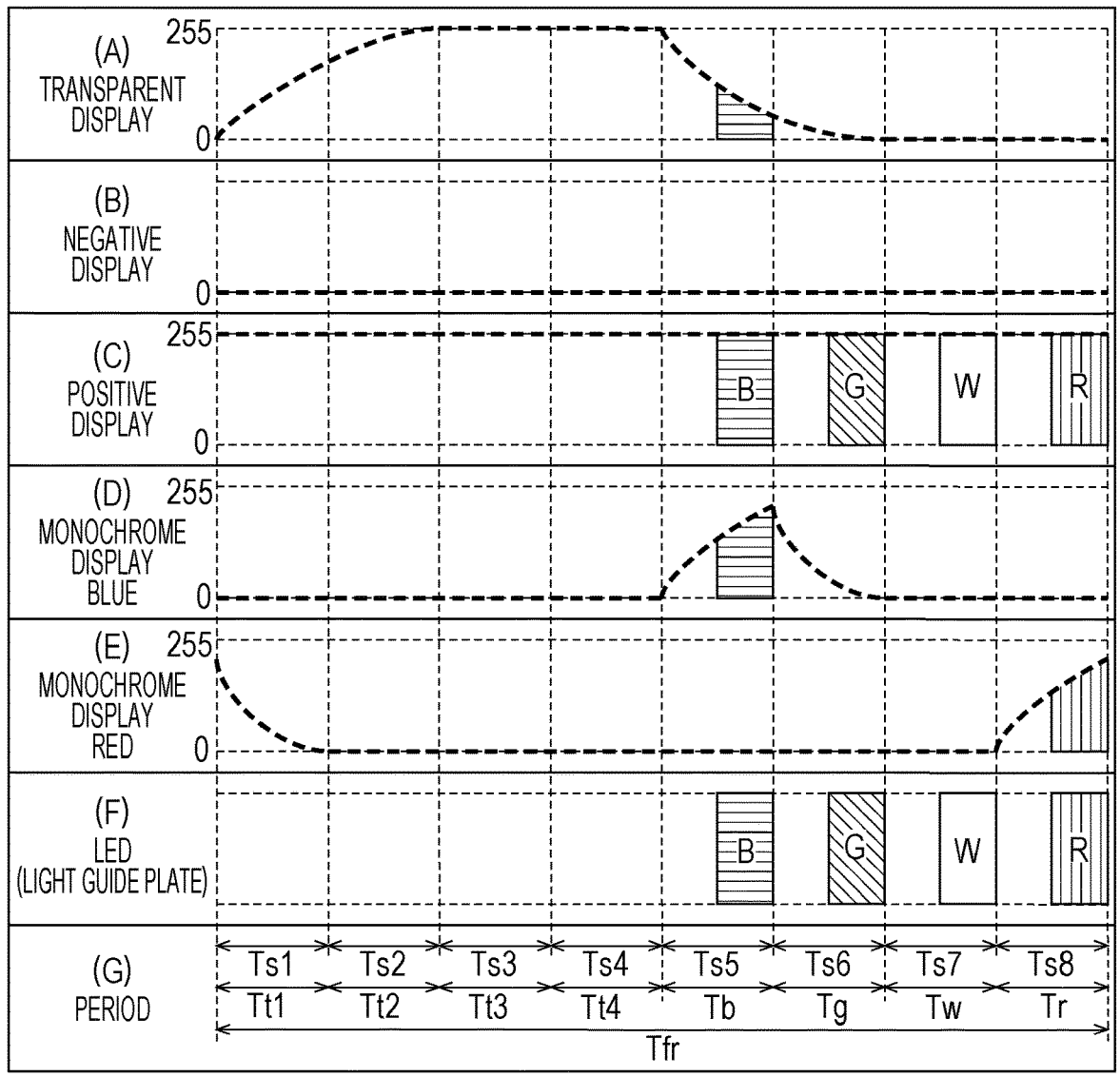
Figure 9:
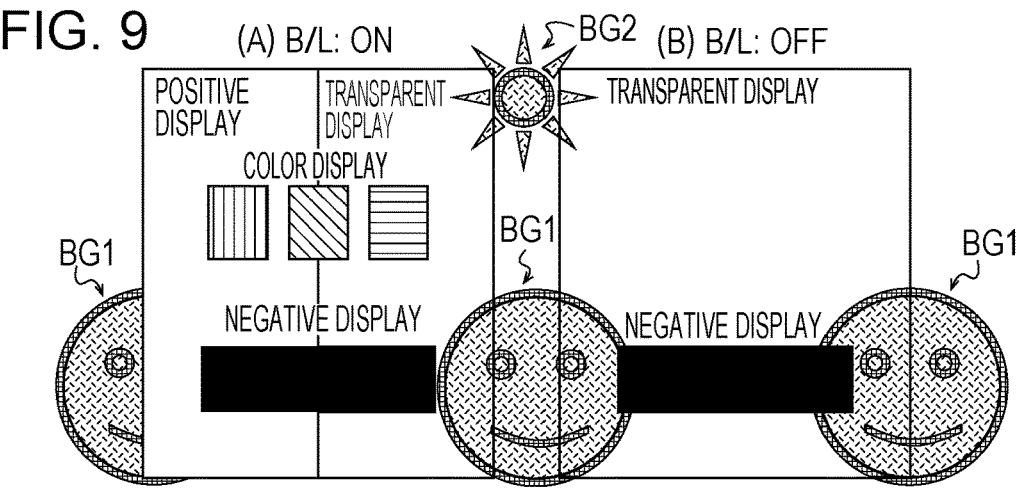
FIG. 9 is a schematic diagram (A and B) illustrating a display example produced by the image display apparatus according to the first embodiment.

FIG. 8 is a timing chart and a waveform diagram for describing a display operation of the image display apparatus 1 according to the present embodiment in which the backlight unit 25 is driven as illustrated in FIG. 5. FIG. 9 is a schematic diagram illustrating a display example produced by the image display apparatus 1. The image display apparatus 1 has a display operation mode (hereinafter, referred to as a "B/L turn-on mode") for turning on the backlight unit 25 and a display operation mode (hereinafter, referred to as a "B/L turn-off mode") for not turning on the backlight unit. FIG. 5 and FIG. 8 illustrate a display operation of the image display apparatus 1 in the B/L turn-on mode. In the present embodiment, control information that specifies, frame by frame, any mode of the B/L turn-on mode and the B/L turn-off mode in which an operation is performed is included in the input image data D1. Switching is performed between the B/L turn-on mode and the B/L turn-off mode by inputting the turn-on control signal Cb1 generated by the driving image data calculating unit 33 into the backlight unit drive circuit 23 based on the control information. Instead, a configuration in which an operating unit for switching between the B/L turn-on mode and the B/L turn-off mode is disposed, or a configuration in which a control signal specifying any of the B/L turn-on mode and the B/L turn-off mode is input from the outside may be employed. Hereinafter, a display operation in the B/L turn-on mode will be basically described, and a display operation in the B/L turn-off mode will be mentioned below.

As described above, in the B/L turn-on mode of the present embodiment, as illustrated in FIG. 5 and part (F) of FIG. 8, in one frame period Tfr, only the blue light source 27b is in the turn-on state in the second half of the blue subframe period Tb. In the second half of the green subframe period Tg, only the green light source 27g is in the turn-on state. In the second half of the white subframe period Tw, all of the red, green, and blue light sources 27r, 27g, and 27b are in the turn-on state. In the second half of the red subframe period Tr, only the red light source 27r is in the turn-on state. In other periods, all of the red, green, and blue light sources 27r, 27g, and 27b are in the turn-off state.

In the B/L turn-on mode, the driving image data D2 for the panel drive circuit 22 to drive the liquid crystal panel 24 as described below is generated by the driving image data calculating unit 33. That is, in a transparent area in an image (hereinafter, simply referred to as a "display image") to be displayed on the liquid crystal panel 24, in order to form pixels in the transparent area, pixel data that indicates a gray scale value of 255 (maximum transmittance) is written into the liquid crystal panel 24 in the first half (scanning period Tsc) of each of the first to fourth transparent subframe periods Tt1 to Tt4 constituting the transparent display subframe period Tt. In the first half (scanning period Tsc) of each of the blue, green, white, and red subframe periods Tb, Tg, Tw, and Tr constituting the typical display subframe period Tn, pixel data that indicates a gray scale value of 0 (minimum transmittance) is written into the liquid crystal panel 24 (refer to FIG. 5 and part (A) of FIG. 8). Consequently, in each frame period Tfr, the transmittance of the liquid crystal corresponding to the transparent area changes as illustrated by a bold dotted line in part (A) of FIG. 8. In addition, in the first to fourth transparent subframe periods Tt1 to Tt4, since all of the red, green, and blue light sources 27r, 27g, and 27b in the backlight unit 25 are in the turn-off state, the light guide plate 270 is in the transparent state. Therefore, the transparent area in the display image is recognized as the transparent state (a state where the background is seen through).

In a black area in the display image, in order to form pixels in the black area, pixel data that indicates a gray scale value of 0 (minimum transmittance) is written into the liquid crystal panel 24 in the first half (scanning period Tsc) of any subframe period in each frame period Tfr (refer to FIG. 5 and part (B) of FIG. 8). Consequently, as illustrated by a bold dotted line in part (B) of FIG. 8, the transmittance of the liquid crystal corresponding to the black area is a constant value (minimum transmittance) corresponding to the gray scale value of 0 in each frame period Tfr. Accordingly, the color of the black area in the display image is recognized as black.

In a white area in the display image, in order to form pixels in the white area, pixel data that indicates a gray scale value of 255 (maximum transmittance) is written into the liquid crystal panel 24 in the first half (scanning period Tsc) of any subframe period in each frame period Tfr (refer to FIG. 5 and part (C) of FIG. 8). Consequently, as illustrated by a bold dotted line in part (C) of FIG. 8, the transmittance of the liquid crystal corresponding to the white area is the a constant value (maximum transmittance) corresponding to the gray scale value of 255 in each frame period Tfr. In the second half of each of the blue, green, white, and red subframe periods Tb, Tg, Tw, and Tr constituting the typical display subframe period Tn in each frame period Tfr, the backlight unit 25 emits light of a corresponding color. By such driving of the liquid crystal panel 24 and the backlight unit 25, the color of the white area in the display image is recognized as white.

In a case where a blue single color area is included in the display image (the gray scale value of the single color area is 255), in the single color area, that is, a blue area, in order to form pixels in the blue area, pixel data that indicates a gray scale value of 255 (maximum transmittance) is written into the liquid crystal panel 24 in the first half (scanning period Tsc) of the blue subframe period Tb in each frame period Tfr. In the first half (scanning period Tsc) of the other subframe periods in the frame period Tfr, pixel data that indicates a gray scale value of 0 (minimum transmittance) is written into the liquid crystal panel 24 (refer to FIG. 5 and part (D) of FIG. 8). Consequently, in each frame period Tfr, the transmittance of the liquid crystal corresponding to the blue area changes as illustrated by a bold dotted line in part (D) of FIG. 8. In addition, as described above, in the second half of the blue subframe period Tb, only the blue light source 27b in the backlight unit 25 is in the turn-on state. By such driving of the liquid crystal panel 24 and the backlight unit 25, the color of the blue area in the display image is recognized as blue.

In a case where a red single color area is included in the display image (the gray scale value of the single color area is 255), in the single color area, that is, a red area, in order to form pixels in the red area, pixel data that indicates a gray scale value of 255 (maximum transmittance) is written into the liquid crystal panel 24 in the first half (scanning period Tsc) of the red subframe period Tr in each frame period Tfr. In the first half (scanning period Tsc) of the other subframe periods in the frame period Tfr, pixel data that indicates a gray scale value of 0 (minimum transmittance) is written into the liquid crystal panel 24 (refer to FIG. 5 and part (E) of FIG. 8). Consequently, in each frame period Tfr, the transmittance of the liquid crystal corresponding to the red area changes as illustrated by a bold dotted line in part (E) of FIG. 8. In addition, as described above, in the second half of the red subframe period Tr, only the red light source 27r in the backlight unit 25 is in the turn-on state. By such driving of the liquid crystal panel 24 and the backlight unit 25, the color of the red area in the display image is recognized as red.

In the B/L turn-on mode, by such a display operation illustrated in FIG. 8, positive display (positive display and color display), negative display, and transparent display may be performed at the same time within the same screen as illustrated in, for example, part (A) of FIG. 9.

Figure 10:
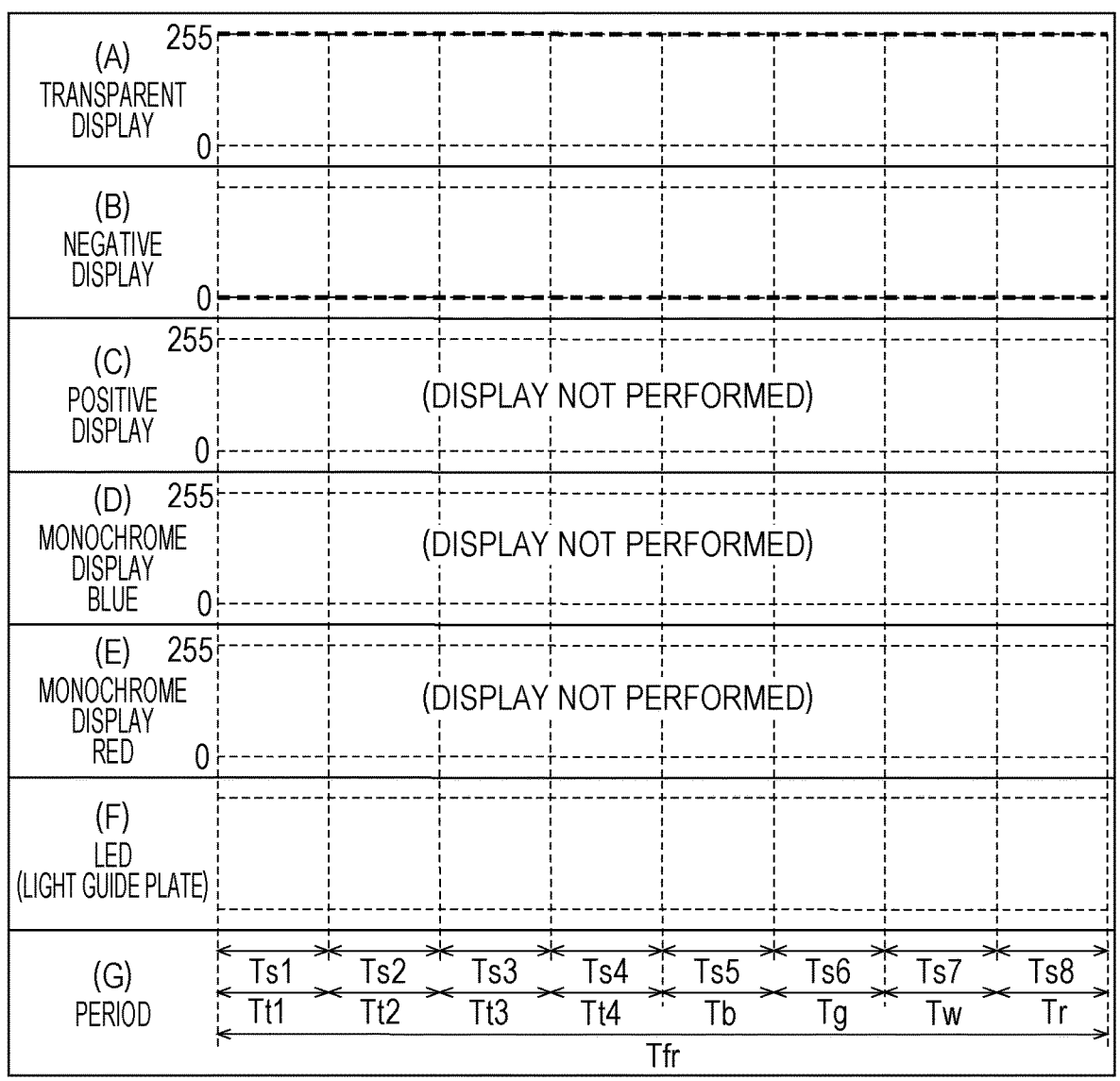

FIG. 10 is a timing chart and a waveform diagram for describing a display operation of the image display apparatus 1 according to the present embodiment in the B/L turn-off mode. In the B/L turn-off mode, as illustrated in part (F) of FIG. 10, in any of the subframe periods Ts1 to Ts8 in each frame period Tfr, all of the light sources 27r, 27g, and 27b of the backlight unit 25 are in the turn-off state. Thus, any of positive display or color display (includes monochrome display) may not be performed (refer to parts (C) to (E) of FIG. 10).

In the B/L turn-off mode, the driving image data D2 for the panel drive circuit 22 to drive the liquid crystal panel 24 as described below is generated by the driving image data calculating unit 33. That is, in a transparent area in the display image, in order to form pixels in the transparent area, pixel data that indicates a gray scale value of 255 (maximum transmittance) is written into the liquid crystal panel 24 in the first half (scanning period Tsc) of any subframe period in each frame period Tfr. Consequently, in each frame period Tfr, the transmittance of the liquid crystal corresponding to the transparent area is a constant value (maximum transmittance) corresponding to the gray scale value of 255 as illustrated in part (A) of FIG. 10. In addition, in the B/L turn-off mode, the light guide plate 270 is maintained in the transparent state. Therefore, the transparent area in the display image is recognized as the transparent state.

In a black area in the display image, in order to form pixels in the black area, pixel data that indicates a gray scale value of 0 (minimum transmittance) is written into the liquid crystal panel 24 in the first half (scanning period Tsc) of any subframe period in each frame period Tfr in a similar manner to that in the B/L turn-on mode. Consequently, as illustrated by a bold dotted line in part (B) of FIG. 10, the transmittance of the liquid crystal corresponding to the black area is a constant value (minimum transmittance) corresponding to the gray scale value of 0 in each frame period Tfr. Accordingly, the color of the black area in the display image is recognized as black.

As described above, in the B/L turn-off mode, while negative display and transparent display may be performed at the same time within the same screen as illustrated in, for example, part (B) of FIG. 9, positive display (positive display and color display), negative display, and transparent display may not be performed at the same time within the same screen. However, in the B/L turn-off mode, in order to form pixels in the transparent area in the display image, the light guide plate 270 is maintained in the transparent state in the whole one frame period Tfr, and the transmittance of the liquid crystal corresponding to the pixels is maintained at its maximum value. Thus, the degree of transparency of the transparent area may be set to be higher than that of the transparent area in the display image in the B/L turn-on mode (refer to part (A) of FIG. 8 and part (A) of FIG. 10).

1.3 Effect

According to the present embodiment, in the B/L turn-on mode, the transparent state may be implemented in a desired area in the display image using a time (transparent subframe periods Tt1 to Tt4) in which the backlight unit 25 is not turned on in one frame period Tfr (refer to part (A) of FIG. 8 and part (A) of FIG. 9). That is, according to the present embodiment, positive display, negative display, and transparent display (same time same screen three state display) may be performed at the same time within the same screen without complicated configurations of display panels and circuits by employing the above field sequential type driving method in a typical configuration that uses the liquid crystal panel and the light guide plate 270. Thus, a new panel having a configuration for pixel formation and a circuit for driving the new panel are not added in order to implement the same time same screen three state display in the related art. Therefore, according to the present embodiment, the occurrence of moire and an increase in cost caused by overlaying a plurality of panels may be avoided, and the same time same screen three state display may be implemented.

In addition, in the present embodiment, the blue subframe period Tb is arranged as the fifth subframe period Ts5 immediately after the transparent display subframe period Tt (immediately after the fourth transparent subframe period Tt4) in each frame period Tfr. Thus, as illustrated in part (A) of FIG. 8, in the blue subframe period Tb, light (blue light) from the blue light source 27b may slightly leak to the front surface side of the liquid crystal panel 24 in the transparent area in the display image due to the response characteristics of the liquid crystal. However, light that is transmitted through a polarizing plate used in the liquid crystal panel 24 tends to have a yellow tinge, and since the complementary color to yellow is blue, blue light that leaks in the transparent area in the display image may not give an uncomfortable feeling related to vision. Therefore, as in the present embodiment, it is desirable to make a configuration in which the blue subframe period Tb is arranged immediately after the transparent display subframe period Tt. However, in a case where such an advantage is not particularly intended, the present disclosure is not limited to the configuration in which the blue subframe period Tb is arranged immediately after the transparent display subframe period Tt.

1.4 First Modification Example

Next, a configuration that improves driving of the liquid crystal panel 24 in order to reduce a leakage of light source light (a leakage of blue light in the example illustrated in part (A) of FIG. 8) in the transparent area in the display image will be described as a first modification example of the first embodiment with reference to FIG. 5, FIG. 11, and FIG. 12.

Figure 11:
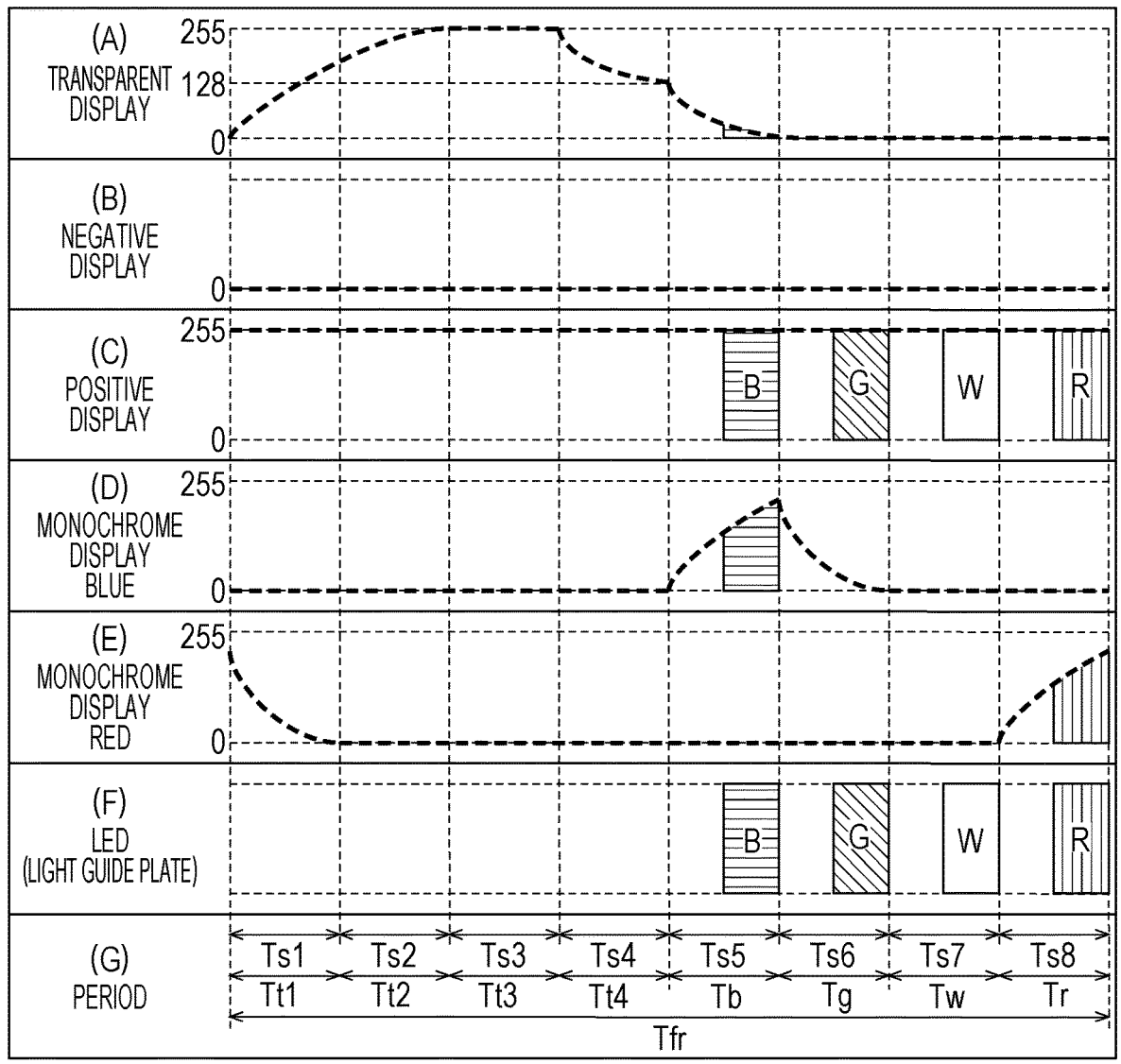
FIG. 11 is a timing chart and a waveform diagram (A to G) for describing a display operation of an image display apparatus according to a first modification example of the first embodiment.

FIG. 11 is a timing chart and a waveform diagram for describing a display operation of an image display apparatus according to the present modification example. FIG. 12 is a schematic diagram illustrating a display example produced by the image display apparatus according to the present modification example. In the configuration of the image display apparatus according to the present modification example, the same or corresponding parts as the image display apparatus according to the first embodiment will be designated by the same reference signs (refer to FIG. 1 to FIG. 3). In addition, the image display apparatus 1 according to the present modification example also has the B/L turn-on mode and the B/L turn-off mode. FIG. 5 and FIG. 11 illustrate the operation of the image display apparatus 1 according to the present modification example in the B/L turn-on mode. Hereinafter, a display operation in the B/L turn-on mode will be basically described. A display operation in the B/L turn-off mode is similar to that in the first embodiment and thus, will not be described (refer to FIG. 10 and part (B) of FIG. 12).

In the present modification example, in order to sufficiently reduce a leakage of light source light (blue light) caused in the transparent area of the display image in the subframe period immediately after the transparent display subframe period Tt, that is, in the blue subframe period Tb as the fifth subframe period Ts5, driving of the liquid crystal panel 24 in the transparent display subframe period Tt (first to fourth transparent subframe periods Tt1 to Tt4) is corrected. Driving of the backlight unit 25 in the present modification example is similar to that in the first embodiment (refer to FIG. 5 and part (F) of FIG. 11).

In the B/L turn-on mode (refer to FIG. 5) of the present modification example, the driving image data D2 for the panel drive circuit 22 to drive the liquid crystal panel 24 as described below is generated by the driving image data calculating unit 33. That is, in the transparent area in the display image, in order to form pixels in the transparent area, pixel data that indicates a gray scale value of 255 (maximum transmittance) is written into the liquid crystal panel 24 in the first half (scanning period Tsc) of each of the first to third transparent subframe periods Tt1 to Tt3 among the first to fourth transparent subframe periods Tt1 to Tt4 constituting the transparent display subframe period Tt, in a similar manner to the first embodiment. In the fourth transparent subframe period Tt4, pixel data that indicates a gray scale value of 128 (transmittance of ½ of the maximum transmittance) is written into the liquid crystal panel 24 unlike the first embodiment. In the first half (scanning period Tsc) of each of the blue, green, white, and red subframe periods Tb, Tg, Tw, and Tr constituting the typical display subframe period Tn, pixel data that indicates a gray scale value of 0 (minimum transmittance) is written into the liquid crystal panel 24 in a similar manner to the first embodiment (refer to FIG. 5 and part (A) of FIG. 11). Consequently, in each frame period Tfr, the transmittance of the liquid crystal corresponding to the transparent area changes as illustrated by a bold dotted line in part (A) of FIG. 11. Accordingly, in the transparent area, a leakage of the light (blue light) of the blue light source 27b that is in the turn-on state in the second half of the blue subframe period Tb as the fifth subframe period Ts5 is sufficiently reduced.

In the example illustrated in part (A) of FIG. 11, pixel data that indicates a gray scale value of 128 (transmittance of ½ of the maximum transmittance) is written into the liquid crystal panel 24 for the transparent area in the fourth transparent subframe period Tt4. However, the gray scale value indicated by the pixel data to be written in the transparent subframe period Tt4 immediately before the typical display subframe period Tn is not limited to 128 but may be a value such that the transmittance of the liquid crystal is sufficiently decreased in the second half of the blue subframe period Tb as the subframe period Ts5 immediately after the transparent display subframe period Tt, that is, in a period in which the blue light source 27b is turned on.

In the present modification example, by driving the liquid crystal panel 24 as described above, the transmittance of the liquid crystal is adjusted by using the fact that the backlight unit 25 is not turned on in the transparent display subframe period Tt (particularly, the fourth transparent subframe period Tt4). Thereby, the light source light from the backlight unit 25 including the blue light source 27b is sufficiently blocked in order to form the pixels in the transparent area in the B/L turn-on mode as illustrated in part (A) of FIG. 11.

Driving of the liquid crystal panel 24 for negative display, positive display, and monochrome display in the present modification example is similar to that in the first embodiment as illustrated in parts (B) to (E) of FIG. 11.

Figure 12:
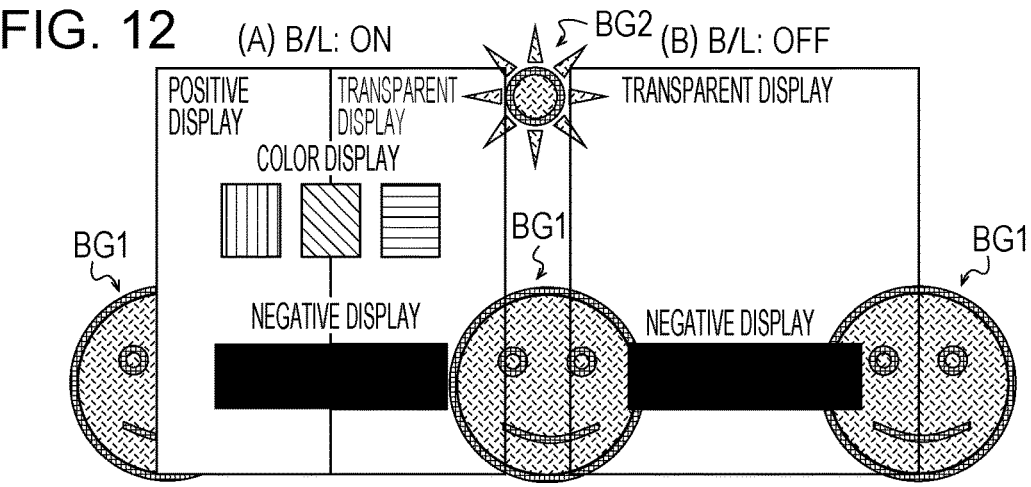
FIG. 12 is a schematic diagram (A and B) illustrating a display example produced by the image display apparatus according to the first modification example of the first embodiment.

According to the present modification example, positive display (color display), negative display, and transparent display may be performed at the same time within the same screen as illustrated in part (A) of FIG. 12 in a similar manner to the first embodiment. In addition, according to the present modification example, as described above, since the light source light from the backlight unit 25 including the blue light source 27b is sufficiently blocked in the transparent display, transparent display better than that in the first embodiment is enabled.

1.5 Second Modification Example

In the first embodiment, the typical display subframe period Tn is configured with four subframe periods configured with the blue, green, white, and red subframe periods Tb, Tg, Tw, and Tr. However, the typical display subframe period Tn may be configured with three subframe periods configured with the blue, green, and red subframe periods Tb, Tg, and Tr without setting the white subframe period Tw. Hereinafter, an image display apparatus having such a configuration will be described as a second modification example of the first embodiment with reference to FIG. 13 and FIG. 14.

Figure 13:
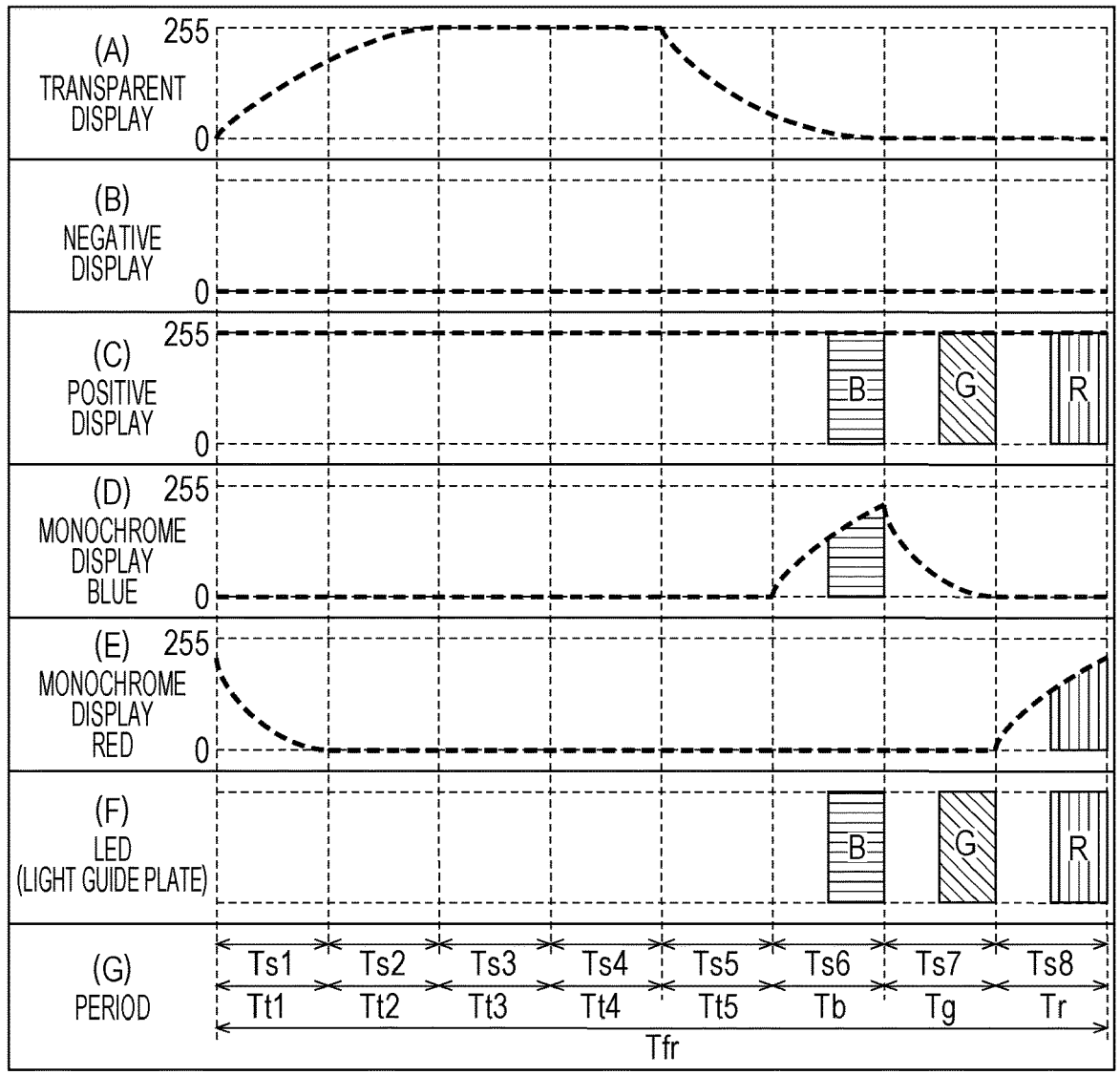
FIG. 13 is a timing chart and a waveform diagram (A to G) for describing a display operation of an image display apparatus according to a second modification example of the first embodiment.
Figure 14:
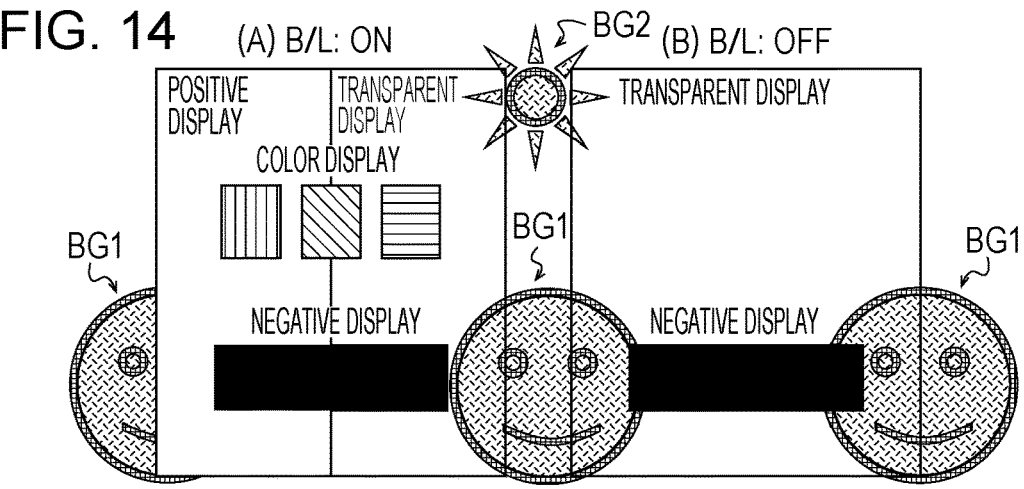
FIG. 14 is a schematic diagram (A and B) illustrating a display example produced by the image display apparatus according to the second modification example of the first embodiment.

FIG. 13 is a timing chart and a waveform diagram for describing a display operation of the image display apparatus according to the present modification example. FIG. 14 is a schematic diagram illustrating a display example produced by the image display apparatus according to the present modification example. In the configuration of the image display apparatus according to the present modification example, the same or corresponding parts as the image display apparatus according to the first embodiment will be designated by the same reference signs (refer to FIG. 1). In addition, the image display apparatus 1 according to the present modification example has the B/L turn-on mode and the B/L turn-off mode. FIG. 13 illustrates the operation of the image display apparatus 1 according to the present modification example in the B/L turn-on mode. Hereinafter, a display operation in the B/L turn-on mode will be basically described. A display operation in the B/L turn-off mode is similar to that in the first embodiment and thus, will not be described (refer to FIG. 10 and part (B) of FIG. 14).

As illustrated in part (F) of FIG. 13, in the B/L turn-on mode of the present modification example, in one frame period Tfr, only the blue light source 27b is in the turn-on state in the second half of the blue subframe period Tb as the sixth subframe period Ts6. In the second half of the green subframe period Tg as the seventh subframe period Ts7, only the green light source 27g is in the turn-on state. In the second half of the red subframe period Tr as the eighth subframe period Ts8, only the red light source 27r is in the turn-on state. In other periods (first to fifth subframe periods Ts1 to Ts5 and the like), all of the red, green, and blue light sources 27r, 27g, and 27b are in the turn-off state.

In the B/L turn-on mode, the driving image data D2 for the panel drive circuit 22 to drive the liquid crystal panel 24 as described below is generated by the driving image data calculating unit 33. That is, in the transparent area in the display image, in order to form pixels in the transparent area, pixel data that indicates a gray scale value of 255 (maximum transmittance) is written into the liquid crystal panel 24 in the first half (scanning period Tsc) of any of the first to fourth transparent subframe periods Tt1 to Tt4 constituting the transparent display subframe period Tt. In the first half (scanning period Tsc) of each of the fifth subframe period Ts5 (fifth transparent subframe period Tt5), the blue subframe period Tb, the green subframe period Tg, and the red subframe period Tr, pixel data that indicates a gray scale value of 0 (minimum transmittance) is written into the liquid crystal panel 24 (refer to parts (A) and (G) of FIG. 13). Consequently, in each frame period Tfr, the transmittance of the liquid crystal corresponding to the transparent area changes as illustrated by a bold dotted line in part (A) of FIG. 13.

In the present modification example compared to the first embodiment, the length of a subframe period in which the backlight unit 25 is not turned on increases. Even in the fifth subframe period Ts5 (fifth transparent subframe period Tt5) immediately before the blue subframe period Tb, the backlight unit 25 is in the turn-off state. In the scanning period Tsc that is the first half of the fifth subframe period Ts5, pixel data that indicates a gray scale value of 0 (minimum transmittance) is written into the liquid crystal panel 24 for the transparent area in the display image as described above. Thus, the light guide plate 270 is in the transparent state in the first to fifth subframe periods Ts1 to Ts5. In the transparent area, a leakage of the light source light from the backlight unit 25 including the blue light source 27b in the typical display subframe period Tn including the blue subframe period Tb is securely reduced. Consequently, the transmittance of the transparent area in the display image is improved from that in the first embodiment.

Driving of the liquid crystal panel 24 for negative display, positive display, and monochrome display in the present modification example is substantially similar to that in the first embodiment as illustrated in parts (B) to (E) of FIG. 13.

According to the present modification example, while the effect of reducing color breakup by setting a common color subframe period is not achieved since the white subframe period Tw is not set, a similar effect to the first embodiment is achieved except for such a point. That is, even in the present modification example, as illustrated in part (A) of FIG. 14, positive display (color display), negative display, and transparent display may be performed at the same time within the same screen. In addition, according to the present modification example, as described above, the transmittance (degree of transparency) of the transparent area in the display image is improved from that in the first embodiment.

1.6 Third Modification Example

In a case where a single color image having the color of any one light source 27x (x=r, g, or b) of the light sources 27r, 27g, and 27b in the backlight unit 25 is displayed, that is, in a case where the image (input image) represented by the input image data D1 is a single color image of any of red, green, or blue, only a light source corresponding to the single color may be turned on (other light sources may not be used). In this case, while the backlight unit 25 may be configured to include only the single color light source 27x, the backlight unit 25 may include the red, green, and blue light sources 27r, 27g, and 27b, and the turn-on control signal Cb1 indicating which light source of the red, green, and blue light sources 27r, 27g, and 27b is to be turned on may be introduced. In a case where the image represented by the input image data D1 is a single color image of any of red, green, or blue, it is desirable that the driving image data D2, the subframe color indication signal BLD, and the turn-on control signal Cb1 are generated such that the backlight unit 25 and the liquid crystal panel 24 are more appropriately driven depending on the single color. Hereinafter, an image display apparatus having such a configuration will be described as a third modification example of the first embodiment with reference to FIG. 15 and FIG. 16.

Figure 15:
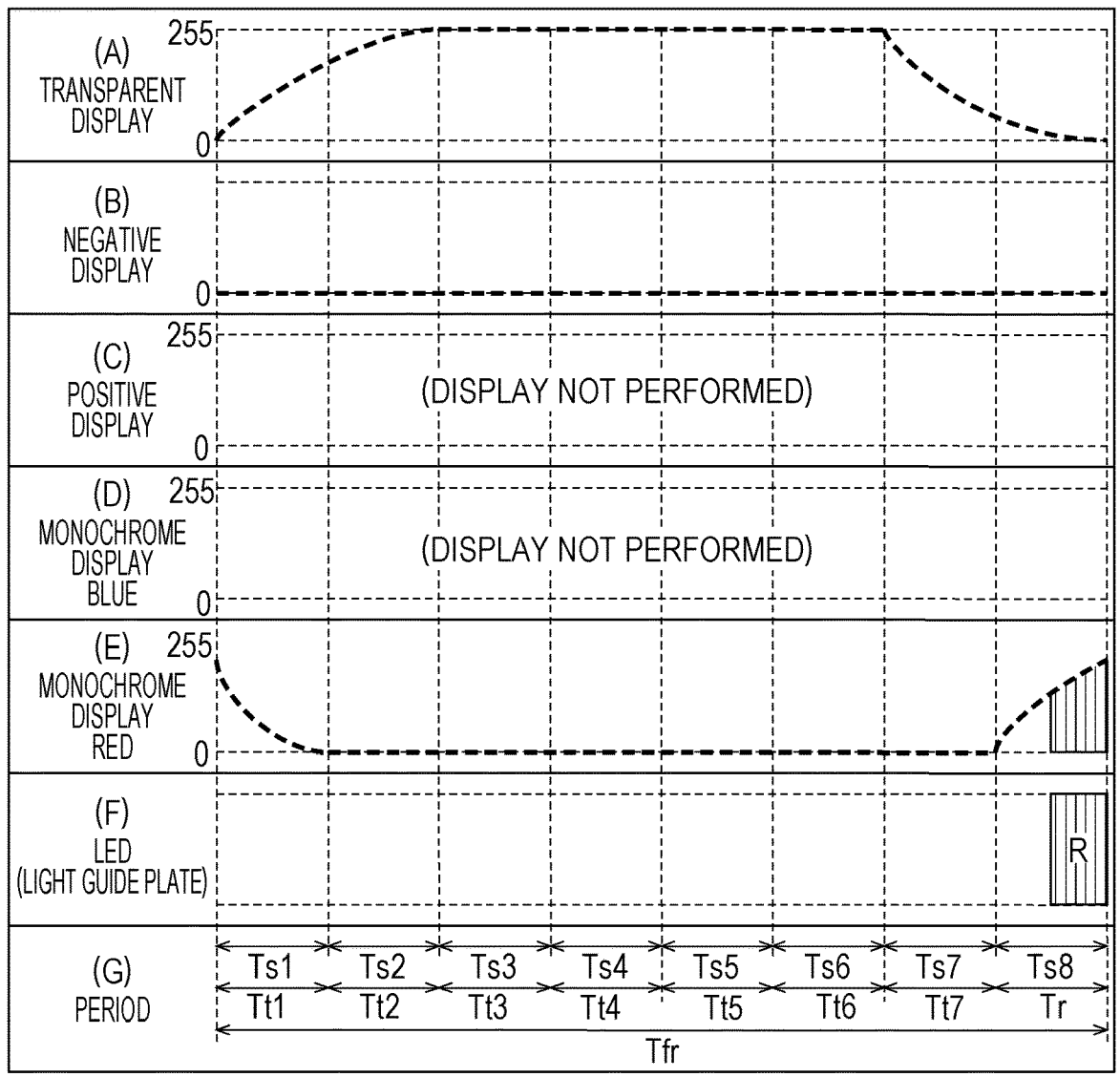
FIG. 15 is a timing chart and a waveform diagram (A to G) for describing a display operation of an image display apparatus according to a third modification example of the first embodiment.
Figure 16:
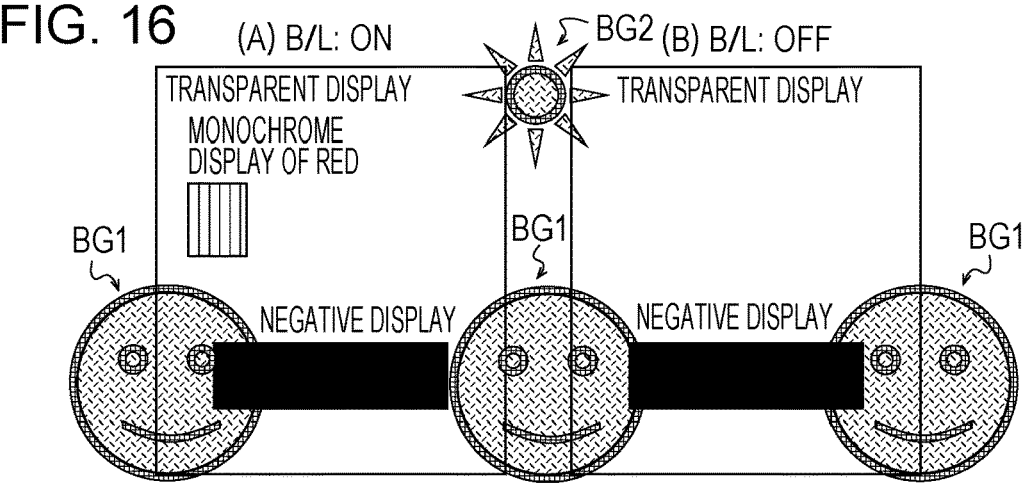
FIG. 16 is a schematic diagram (A and B) illustrating a display example produced by the image display apparatus according to the third modification example of the first embodiment.

FIG. 15 is a timing chart and a waveform diagram for describing a display operation of the image display apparatus according to the present modification example. FIG. 16 is a schematic diagram illustrating a display example produced by the image display apparatus according to the present modification example. In the configuration of the image display apparatus according to the present modification example, the same or corresponding parts as the image display apparatus according to the first embodiment will be designated by the same reference signs (refer to FIG. 1). In addition, the image display apparatus 1 according to the present modification example has the B/L turn-on mode and the B/L turn-off mode. FIG. 15 illustrates the operation of the image display apparatus 1 according to the present modification example in the B/L turn-on mode. Hereinafter, a display operation in the B/L turn-on mode will be basically described. A display operation in the B/L turn-off mode is similar to that in the first embodiment and thus, will not be described (refer to FIG. 10 and part (B) of FIG. 16).

The driving image data calculating unit 33 in the present modification example executes a single color image determination process of determining whether or not the input image is a single color image based on the input image data D1 and determining the color of the single color image in a case where the input image is a single color image. That is, the single color image determination process includes steps (ST1) to (ST3) below. Each time the input image data D1 of one frame is input, the driving image data calculating unit 33 executes steps (ST1) to (ST3) and then, executes a process (image data conversion process) of obtaining the driving image data D2 from the input image data D1.

(ST1): A determination as to whether or not the input image represented by the image data D1 of one frame is a single color image is executed. The color of each pixel constituting the input image is any of a transparent color, black, red, green, or blue. In a case where all chromatic (a color of any of red, green, and blue) pixels in the input image have the same color, it is determined that the input image is a single color image. Otherwise, it is determined that the input image is not a single color image.

(ST2): In a case where the input image is a single color image as a result of determination in step (ST1), a determination as to whether the color of chromatic pixels included in the input image is red, green, or blue (hereinafter, the color determined in this determination will be referred to as an "input color") is executed, and a transition is made to step ST3. When chromatic pixels are not included in the input image in a case where the input image is a single color image, the input color is "achromatic". In a case where the input image is not a single color image as a result of determination in step (ST1), the turn-on control signal Cb1 that indicates that all of the red light source 27r, the green light source 27g, and the blue light source 27b are turned on is generated, and the single color image determination process is finished.

(ST3): In a case where the input color is any of red, green, or blue, the turn-on control signal Cb1 that indicates that only the light source 27 corresponding to the input color among the red light source 27r, the green light source 27g, and the blue light source 27b is turned on is generated. In a case where the input color is achromatic, the turn-on control signal Cb1 that indicates that all of the red light source 27r, the green light source 27g, and the blue light source 27b are turned off is generated. Then, the single color image determination process is finished.

In a case where it is assumed that a pixel of any color of red, blue, and green is included in any frame of the input image represented by the input image data D1 input into the image display apparatus 1, the process related to the achromatic color in steps (ST2) and (ST3) is not performed. While such an assumption is established below, the input image configured with only achromatic pixels may not be handled as a single color image instead.

FIG. 15 is a timing chart and a waveform diagram illustrating a display operation of the image display apparatus 1 in a case where it is determined that the input color is red in the single color image determination process, that is, in a case where the image represented by the input image data D1 is a single color image of red. As illustrated in part (F) of FIG. 15, in the B/L turn-on mode of the present modification example, in one frame period Tfr, only the red light source 27r is in the turn-on state in the second half of the red subframe period Tr as the eighth subframe period Ts8. In other periods (first to seventh subframe periods Ts1 to Ts7), the backlight unit 25 (all of the red, green, and blue light sources 27r, 27g, and 27b) is in the turn-off state.

In the B/L turn-on mode, the driving image data D2 for the panel drive circuit 22 to drive the liquid crystal panel 24 as described below is generated by the driving image data calculating unit 33. That is, in the transparent area in the display image, in order to form pixels in the transparent area, pixel data that indicates a gray scale value of 255 (maximum transmittance) is written into the liquid crystal panel 24 in the first half (scanning period Tsc) of any of the first to sixth transparent subframe periods Tt1 to Tt6 constituting the transparent display subframe period Tt. In the first half (scanning period Tsc) of the seventh transparent subframe period Tt7 as the seventh subframe period Ts7 and the red subframe period Tr as the eighth subframe period Ts8, pixel data that indicates a gray scale value of 0 (minimum transmittance) is written into the liquid crystal panel 24 (refer to parts (A) and (G) of FIG. 15). Consequently, in each frame period Tfr, the transmittance of the liquid crystal corresponding to the transparent area changes as illustrated by a bold dotted line in part (A) of FIG. 15. In addition, as described above, in the first to seventh subframe periods Ts1 to Ts7, since the light source 27 of the backlight unit 25 is not turned on, the light guide plate 270 is in the transparent state. Therefore, according to the present modification example, the transmittance (degree of transparency) of the transparent area in the display image is further improved.

In the present modification example, driving of the liquid crystal panel 24 for monochrome display of red, that is, driving of the liquid crystal panel 24 for forming pixels in a red area in the display image, is similar to that in the first embodiment as illustrated in part (E) of FIG. 15. In addition, driving of the liquid crystal panel 24 for negative display is also similar to that in the first embodiment as illustrated in part (B) of FIG. 15. In the present modification example, since the input image data D1 represents a single color image of red, driving of the liquid crystal panel 24 for positive display or monochrome display of blue is not performed.

According to the present modification example, in a case where the input image data D1 represents a single color image of red, monochrome display of red, negative display, and transparent display may be performed at the same time within the same screen as illustrated in part (A) of FIG. 16, and the transmittance (degree of transparency) of the transparent area in the display image that is the single color image of red is further improved. Even in a case where the input image data D1 represents a single color image of another color (any of blue and green), a similar effect may be achieved by driving the backlight unit 25 and the liquid crystal panel 24 as described above depending on the other color (causing the image data converting unit 10 to generate the driving image data D2 and the subframe color indication signal BLD for such driving).

2. Second Embodiment 2.1 Overall Configuration

Figure 17:
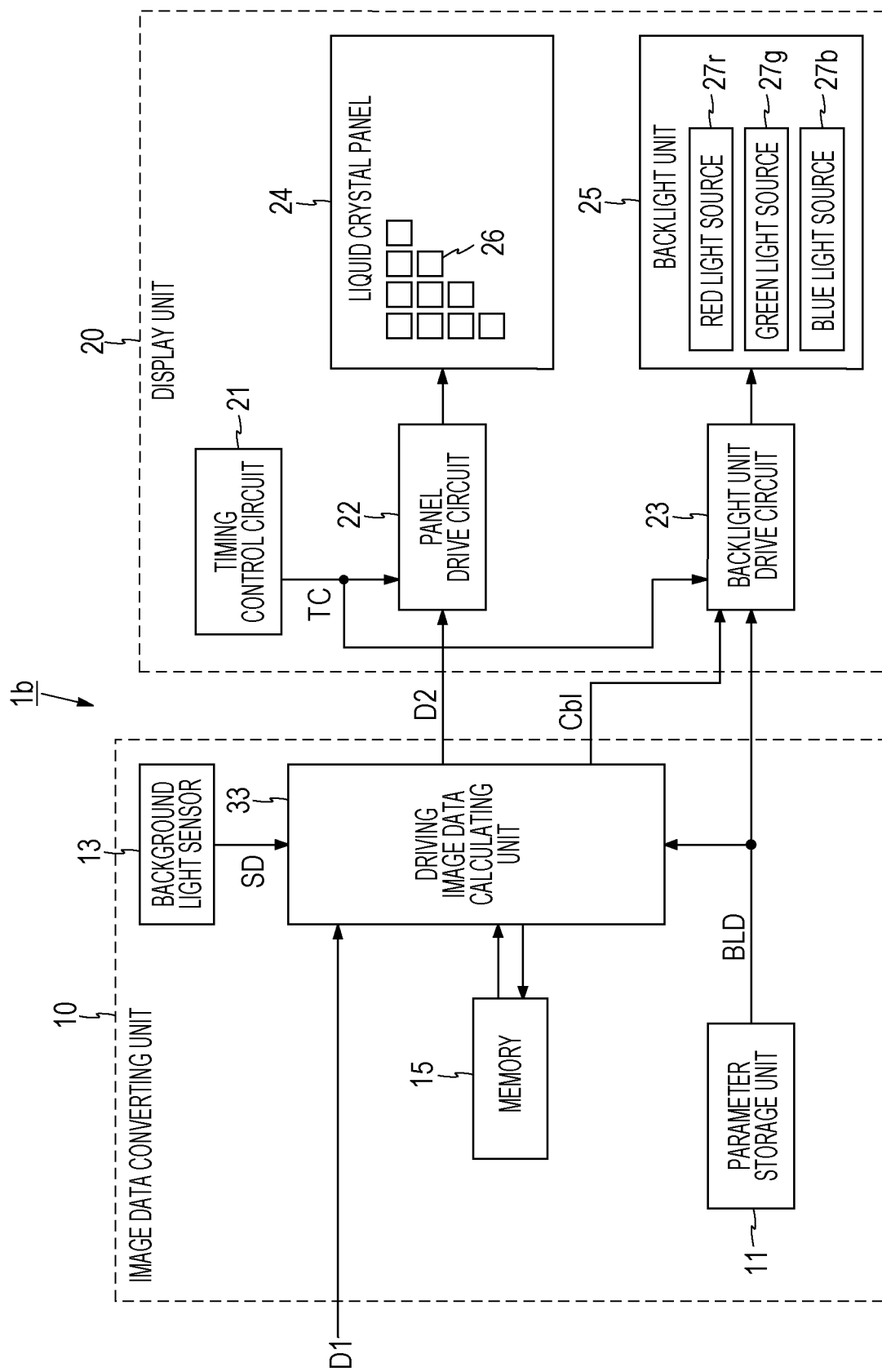
FIG. 17 is a block diagram illustrating a configuration of an image display apparatus according to a second embodiment.

Next, an image display apparatus according to a second embodiment will be described. The image display apparatus according to the present embodiment is configured to detect light (hereinafter, referred to as "background light") that is directed toward the rear surface of the liquid crystal panel 24 from the outside of the image display apparatus, and drive a liquid crystal panel as a light modulating unit considering the background light. FIG. 17 is a block diagram illustrating a configuration of an image display apparatus 1b according to the present embodiment. The image display apparatus 1b includes the image data converting unit 10 and the display unit 20 in a similar manner to the first embodiment (FIG. 1). The image data converting unit 10 includes the parameter storage unit 11 and the driving image data calculating unit

33. The display unit 20 includes the liquid crystal panel 24 as a light modulating unit; the backlight unit 25 as a light source section including the red light source 27*r*, the green light source 27*g*, the blue light source 27*b*, and a light guide plate; the timing control circuit 21; the panel drive circuit 22 as a light modulating unit drive circuit; and the backlight unit drive circuit 23 as a light source section drive circuit. These constituents in the image display apparatus 1*b* basically have a similar configurations and functions to the constituents of the image display apparatus 1 according to the first embodiment (refer to FIG. 3 and FIG. 5). Thus, only configurations and functions different from the first embodiment will be described below. In addition to those constituents, the image display apparatus 1*b* includes a background light sensor 13 as a light detector for detecting the background light in the image data converting unit 10. The background light sensor 13 outputs a sensor signal SD that indicates the color and the light intensity of the detected background light. The sensor signal SD is input into the driving image data calculating unit 33. Accordingly, the present embodiment is configured such that the liquid crystal panel is driven using a driving method that is adapted for the background light (details will be described below). It is desirable that the driving method for the liquid crystal panel is gradually adapted for the background light such that a change in time direction is not easily recognized. Therefore, in a case where the driving method is gradually adapted, the image data converting unit 10 includes a memory 15. For such gradual adaptation, driving image data of one frame in which the intensity or the like of the background light indicated by the sensor signal SD is considered is temporarily stored in the memory 15.

The image display apparatus 1*b* according to the present embodiment is also a field sequential type liquid crystal display apparatus. The light sources 27*r*, 27*g*, and 27*b* in the backlight unit 25 are driven in the same manner (timing) as those in the first embodiment (refer to FIG. 3, FIG. 5, and part (F) of FIG. 20 described below).

Even in the image display apparatus 1*b* according to the present embodiment, the input image data D1 that includes red, green, blue, and transparent color image data is input. The image data converting unit 10 obtains the driving image data D2 corresponding to the transparent color, green, red, white, and blue subframes based on the input image data D1 considering the intensity of the background light indicated by the sensor signal SD from the background light sensor 13. The display unit 20 displays the transparent color, green, red, white, and blue subframes in one frame period based on the driving image data D2.

2.2. Summary of Characteristic Configuration

Next, a summary of a characteristic configuration of the present embodiment will be described with reference to FIGS. 18A and 18B and FIGS. 19A and 19B. FIGS. 18A and 18B are diagrams for describing an object in the image display apparatus in the related art that is to be dealt with by the characteristic configuration. FIGS. 19A and 19B are diagrams for describing a method for achieving the object in relation to the characteristic configuration.

Even in a case where the same single color is displayed by a typical display apparatus, the displayed single color looks brighter in a bright room than in a dark room due to a contrast effect with the luminosity around the displayed single color, that is, luminosity contrast, as illustrated in FIG. 18A. Thus, in the bright room, the look of the displayed single color may not give a good impression.

In a transparent display in which an organic light emitting diode (hereinafter, referred to as an "OLED") is used, part of pixels is transparent. Thus, the light of the background is transmitted through an area where a single color is displayed in the display image. Thus, the luminance of the displayed single color in the bright room is improved, the look of the displayed single color may give a good impression. In a case where the color of the background light is different from the displayed single color, a color shift may occur, and the look of the displayed single color may not give a good impression.

In the liquid crystal display apparatus as a field sequential type transparent display, in a case where a single color corresponding to any light source color is displayed, the transmittance of the liquid crystal changes as illustrated by a bold solid line in FIG. 18B by setting the light source corresponding to the single color among the plurality of light sources in the backlight unit to be in the turn-on state in only one subframe period in one frame period and writing the pixel data indicating the maximum transmittance into the liquid crystal panel in the subframe period as illustrated in FIG. 18B. Thus, the transmittance of the liquid crystal panel in the monochrome display is decreased to a great extent, and the luminance of the displayed single color in the bright room is almost not improved, compared to that in a configuration in which part of pixels is transparent as in the transparent display in which the OLED is used. Consequently, the look of the displayed single color in the bright room does not give a good impression.

Meanwhile, as in the first embodiment, in a case where the transparent subframe period Ttk (a subframe period in which the light guide plate 270 is in the transparent state without the light source 27 turned on) is included in each frame period Tfr in order to perform the same time same screen three state display, it is considered that the monochrome display is improved by adjusting the transmittance of the liquid crystal in the transparent subframe period Ttk considering the color or the like of the background light. For example, when the color of the background light is white or red in a case where red is to be displayed as a single color, it is considered that as illustrated in FIG. 19B, the liquid crystal panel is driven such that the pixel data indicating the maximum transmittance is written into the liquid crystal panel in not only the subframe period Tr in which the red light source is in the turn-on state, but also the transparent subframe period Ttk in which the backlight unit is not turned on. According to such a configuration, as illustrated in FIG. 19A, the look of red as the displayed single color in the bright room may give a good impression. The image display apparatus 1*b* according to the present embodiment has such a configuration as a characteristic configuration in which the background light sensor 13 described above is used. Below, the color of the background light is regarded as white, and the image display apparatus 1*b* according to the present embodiment is configured such that monochrome display is improved based on the intensity (luminance) between the color and the intensity of the background light indicated by the sensor signal SD. Thus, in the present embodiment, a light detector that detects only the intensity of the background light may be used as the background light sensor 13. A configuration that improves monochrome display using the color (background color) indicated by the sensor signal SD will be described below as a modification example of the present embodiment.

2.3 Display Operation

Figure 20:
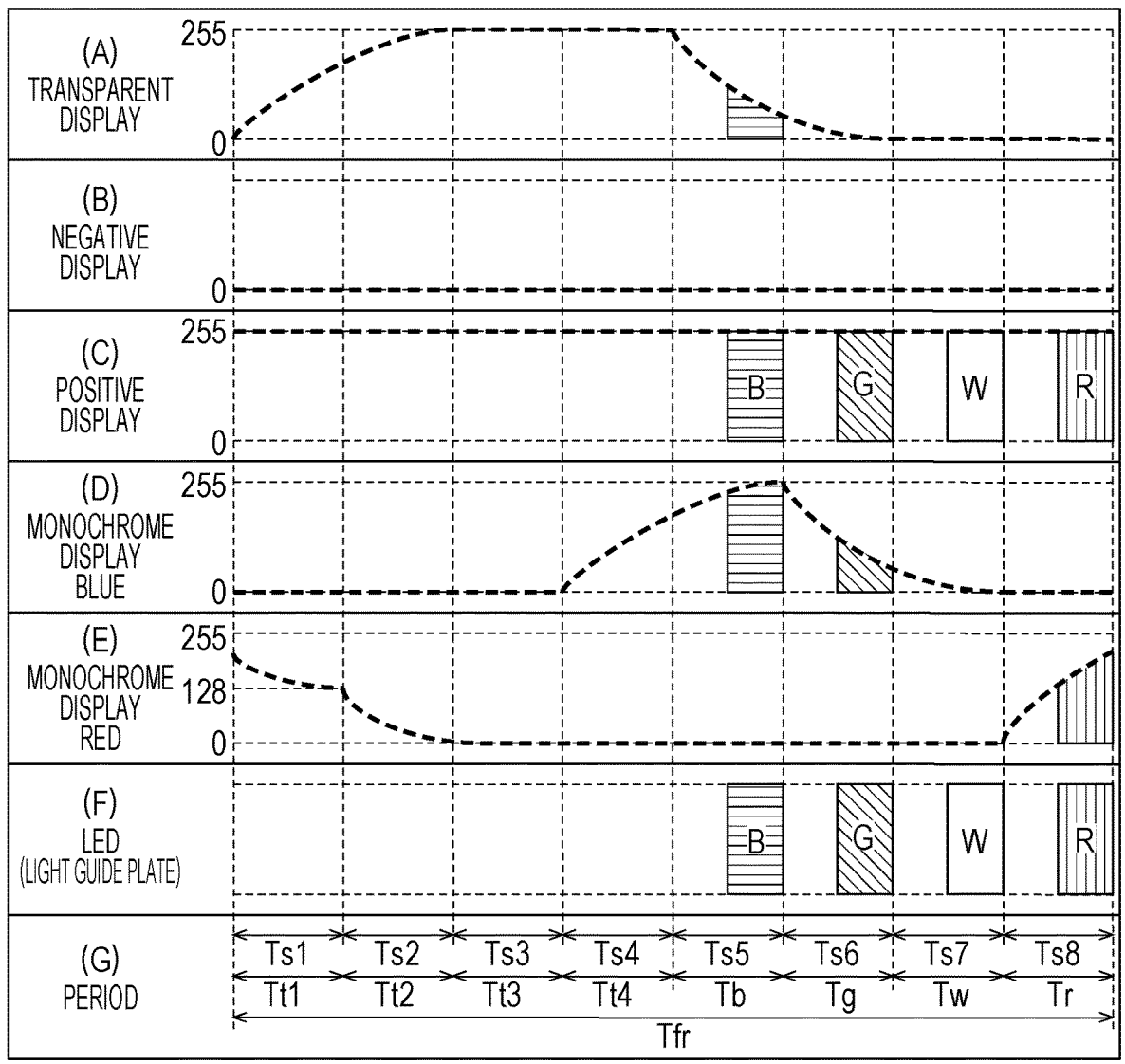
FIG. 20 is a timing chart and a waveform diagram (A to G) for describing a display operation of the image display apparatus according to the second embodiment.
Figure 21:
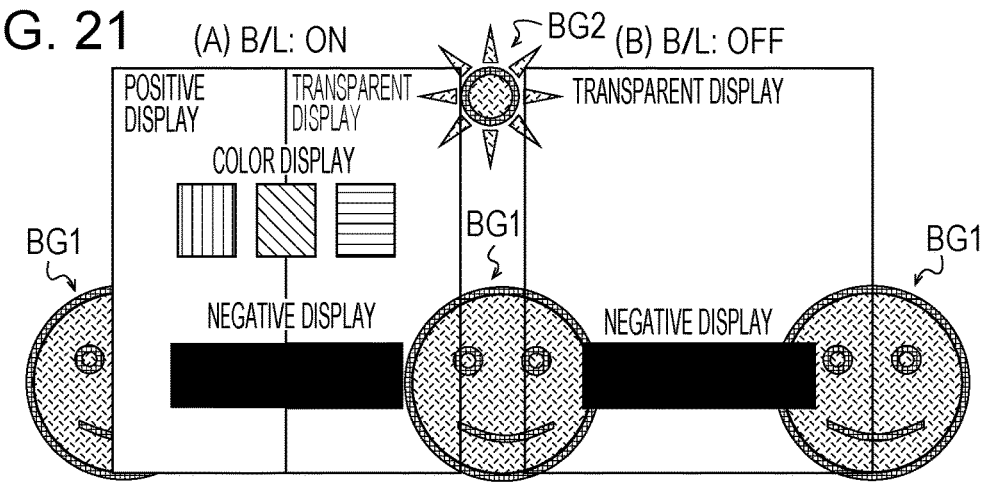
FIG. 21 is a schematic diagram (A and B) illustrating a display example produced by the image display apparatus according to the second embodiment.

FIG. 20 is a timing chart and a waveform diagram for describing a display operation of the image display apparatus 1b according to the present embodiment. FIG. 21 is a schematic diagram illustrating a display example produced by the image display apparatus 1b. The image display apparatus 1b according to the present embodiment has the B/L turn-on mode and the B/L turn-off mode in a similar manner to the first embodiment. FIG. 20 and FIG. 21 illustrate the operation of the image display apparatus 1b in the B/L turn-on mode. Hereinafter, a display operation in the B/L turn-on mode will be basically described. A display operation in the B/L turn-off mode is similar to that in the first embodiment and thus, will not be described (refer to FIG. 10 and part (B) of FIG. 21).

The driving image data calculating unit 33 in the image display apparatus 1b receives the input image data D1 from its outside and the sensor signal SD from the background light sensor 13 and generates the driving image data D2 such that the luminance of monochrome display is improved using the background light by adjusting the gray scale (transmittance of the liquid crystal) in at least one transparent subframe period in the transparent display subframe period Tt (first to fourth transparent subframe periods Tt1 to Tt4) depending on the intensity of the background light based on the sensor signal SD. Specifically, the following display operation is performed.

In the B/L turn-on mode (refer to FIG. 5) of the present embodiment, particularly, in the case of monochrome display of a color corresponding to the display color subframe period (the blue subframe period Tb and the red subframe period Tr in the example illustrated in FIG. 20) adjacent to the transparent display subframe period Tt (first to fourth transparent subframe periods Tt1 to Tt4), the liquid crystal panel 24 is driven such that bright display is achieved using the background light of white by adjusting the gray scale (corresponds to the transmittance of the liquid crystal) in a period in which the light guide plate 270 is in the transparent state without the light source 27 turned on, that is, in the first to fourth transparent subframe periods Tt1 to Tt4.

That is, in a case where pixels of the light source color (blue) in the blue subframe period Tb as the fifth subframe period Ts5 are included in the image (input image) represented by the input image data D1, the gray scale of the pixels in the blue area is adjusted in at least one of the first to fourth transparent subframe periods Tt1 to Tt4 in order to improve the luminance of the blue area in the display image. In this case, the driving image data D2 is generated from the input image data D1 by the driving image data calculating unit 33 considering the intensity of the background light indicated by the sensor signal SD, such that an improvement in the luminosity of the pixels in the blue area is prioritized. The liquid crystal panel 24 is driven by the panel drive circuit 22 using the driving image data D2. More specifically, the driving image data D2 is generated such that as the intensity of the background light increases, the gray scale of the pixels in the blue area increases in at least one of the first to fourth transparent subframe periods Tt1 to Tt4. Accordingly, as the intensity of the background light increases, the total gray scale value (transmittance of the liquid crystal) of the pixels in the blue area in the first to fourth transparent subframe periods Tt1 to Tt4, that is, the integral value or the average value of the gray scale values of the pixels in the periods Tt1 to Tt4, increases. For example, as illustrated in part (D) of FIG. 20, in the first half (scanning period Tsc) of each of the first to third transparent subframe periods Tt1 to Tt3, pixel data that indicates a gray scale value of 0 (minimum transmittance) is written into the liquid crystal panel 24. However, in the first half (scanning period Tsc) of not only the fifth subframe period Ts5 (blue subframe period Tb) but also the fourth subframe period Tt4, pixel data that indicates a gray scale value of 255 (maximum transmittance) is written into the liquid crystal panel 24. Consequently, in each frame period Tfr, the transmittance of the liquid crystal corresponding to the blue area changes as illustrated by a bold dotted line in part (D) of FIG. 20. The use of the background light in the fourth subframe period Tt4 and the increase in the transmittance of the liquid crystal in the blue subframe period Tb improve the luminance of the blue area in the display image. In the example illustrated in part (D) of FIG. 20, the reason for increasing the transmittance of the liquid crystal in the fourth subframe period Tt4 (transparent subframe period immediately before the blue subframe period Tb) is that such an increase may increase the display luminance by improving the transmittance in the blue subframe period Tb.

In addition, in a case where pixels of the light source color (red) in the red subframe period Tr as the eighth subframe period Ts8 are included in the input image, the gray scale of the pixels in the red area is adjusted in at least one of the first to fourth transparent subframe periods Tt1 to Tt4 such that the luminance of the red area in the display image is improved. In this case, the driving image data D2 is generated from the input image data D1 by the driving image data calculating unit 33 considering the intensity of the background light indicated by the sensor signal SD, such that an improvement in the luminosity of the pixels in the red area is prioritized. The liquid crystal panel 24 is driven by the panel drive circuit 22 using the driving image data D2. More specifically, the driving image data D2 is generated such that as the intensity of the background light increases, the gray scale of the pixels in the red area increases in at least one of the first to fourth transparent subframe periods Tt1 to Tt4. Accordingly, as the intensity of the background light increases, the total gray scale value (transmittance of the liquid crystal) of the pixels in the red area in the first to fourth transparent subframe periods Tt1 to Tt4, that is, the integral value or the average value of the gray scale values of the pixels in the periods Tt1 to Tt4, increases. For example, as illustrated in part (E) of FIG. 20, in the first half (scanning period Tsc) of the red subframe period Tr as the eighth subframe period Ts8, pixel data that indicates a gray scale value of 255 (maximum transmittance) is written into the liquid crystal panel 24. In the subsequent frame period Tfr, in the first half (scanning period Tsc) of the first transparent subframe period Tt1 adjacent to the red subframe period Tr, pixel data that indicates a gray scale value of 128 (transmittance of ½ of the maximum transmittance) is written into the liquid crystal panel 24. In the scanning period Tsc of other periods including the third and fourth transparent subframe periods Tt3 and Tt4, pixel data that indicates a gray scale value of 0 (minimum transmittance) is written into the liquid crystal panel 24. In a case where the intensity of the background light indicated by the sensor signal SD is higher, for example, pixel data that indicates a gray scale value of 255 (maximum transmittance) may be written into the liquid crystal panel 24 in the first half (scanning period Tsc) of each of the first to fourth transparent subframe periods Tt1 to Tt4 instead of the driving illustrated in part (E) of FIG. 20 in order to further brightly display the red area (red image).

Driving of the liquid crystal panel 24 for negative display and positive display in the present embodiment is similar to that in the first embodiment as illustrated in parts (B) and (C) of FIG. 20.

2.4 Effect

According to the present embodiment, the following effect is achieved in addition to the effect of the first embodiment. That is, in order to use the background light in at least one of the first to fourth transparent subframe periods Tt1 to Tt4 and increase the transmittance of the liquid crystal in the blue subframe period Tb, the gray scale of the pixels in the blue area is adjusted in at least one of the first to fourth transparent subframe periods Tt1 to Tt4 considering the intensity of the background light indicated by the sensor signal SD (refer to part (D) of FIG. 20). Accordingly, the blue area (blue image) in the display image may be brightly displayed. Consequently, a good viewability of the blue area in the display image may be maintained even in an environment where the surrounding area is bright.

In addition, in order to use the background light in at least one of the first to fourth transparent subframe periods Tt1 to Tt4 and increase the transmittance of the liquid crystal in the red subframe period Tr, the gray scale of the pixels in the red area is adjusted in at least one of the first to fourth transparent subframe periods Tt1 to Tt4 considering the intensity of the background light indicated by the sensor signal SD (refer to part (E) of FIG. 20). Accordingly, the red area (red image) in the display image may be brightly displayed. Consequently, a good viewability of the red area in the display image may be maintained even in an environment where the surrounding area is bright.

Even in a case where pixels of the light source color (green) other than blue and red are included in the input image, the luminance of the area having the same color as the light source color in the display image may be improved by adjusting the gray scale of the pixels of the light source color in at least one of the first to fourth transparent subframe periods Tt1 to Tt4 considering the intensity of the background light indicated by the sensor signal SD. In addition, in the present embodiment, the color of the background light is white. Thus, even in a case where pixels of any color based on a plurality of primary colors (in the present embodiment, three primary colors configured with red, blue, and green) are included in the input image, the luminance of the area of the any color in the display image may be improved by adjusting the gray scale of the pixels of the any color in at least one of the first to fourth transparent subframe periods Tt1 to Tt4 considering the intensity of the background light indicated by the sensor signal SD.

2.5 First Modification Example

In the second embodiment, the color of the background light is white. However, even in a case where the color of the background light is not white, a similar effect to the second embodiment is achieved in a case where the color of the background light is similar to the color of monochrome display of which the luminance is to be improved. Meanwhile, in a case where the color of the background light is not similar to the color of monochrome display of which the luminance is to be improved, the actual display color may be seen in the display area such that the actual display color deviates from its original chromaticity. Even in such a case, a decrease in viewability in a bright environment (a phenomenon of darkening in a bright environment) may be reduced by improving the luminance of the display area having the same color as the light source color by adjusting the gray scale of the pixels of the light source color in at least one of the first to fourth transparent subframe periods Tt1 to Tt4 considering the intensity of the background light indicated by the sensor signal SD in a similar manner to the second embodiment. However, in a case where the color of the background light is not similar to the color of monochrome display of which the luminance is to be improved, it is more desirable that the liquid crystal panel is driven in a manner different from that in a case where the color of the background light is white or is similar to the color of monochrome display, in order to reduce deviation of the actual display color from its original chromaticity. Hereinafter, an image display apparatus having such a configuration will be described as a first modification example of the second embodiment. Hereinafter, a display operation in the B/L turn-on mode will be basically described. A display operation in the B/L turn-off mode is similar to that in the first embodiment and thus, will not be described (refer to FIG. 10 and part (B) of FIG. 21).

The image display apparatus according to the present modification example is configured in a similar manner to the second embodiment as illustrated in FIG. 17. Below, the same or corresponding constituents as the constituents illustrated in FIG. 17 among the constituents of the image display apparatus according to the present modification example will be designated by the same reference signs. In the present modification example, the driving image data calculating unit 33 executes a background color determination process of determining whether or not the color of the background light (background color) indicated by the sensor signal SD is similar to the color of monochrome display of which the luminance is to be improved (for example, simply determining whether the background color is white or the same color as the color of monochrome display). The driving image data calculating unit 33 generates the driving image data D2 depending on its determination result. Hereinafter, a display operation in the present modification example will be basically described with details of driving based on the background color determination process with reference to FIG. 8, FIG. 20, and the like. In the present modification example, the driving image data D2 that causes driving described below based on the background color determination process is generated.

That is, in a case where it is determined that the background color indicated by the sensor signal SD is similar to the light source color (blue) in the blue subframe period Tb as the fifth subframe period Ts5, the liquid crystal panel 24 is driven in a similar manner to the second embodiment with respect to the pixels in the blue area in the display image (refer to part (D) of FIG. 20). In a case where it is determined that the background color indicated by the sensor signal SD is similar to the light source color (red) in the red subframe period Tr as the eighth subframe period Ts8, the liquid crystal panel 24 is driven in a similar manner to the second embodiment with for the pixels in the red area in the display image (refer to part (E) of FIG. 20). In a case where it is determined that the background color indicated by the sensor signal SD is not similar to the light source color (blue) in the blue subframe period Tb, driving of the liquid crystal panel 24 that reduces deviation of the display color caused by the background color, for example, driving of the liquid crystal panel 24 illustrated in part (D) of FIG. 8, is executed for the pixels in the blue area in the display image. In addition, in a case where it is determined that the background color indicated by the sensor signal SD is not similar to the light source color (red) in the red subframe period Tr, driving of the liquid crystal panel 24 that reduces deviation of the display color caused by the background color, for example, driving of the liquid crystal panel 24 illustrated in part (E) of FIG. 8, is executed for the pixels in the red area in the display image.

According to the present modification example, deviation of the display color from its original chromaticity due to the background light may be reduced, and a similar effect to the second embodiment may be achieved in a case where the background color indicated by the sensor signal SD is similar to the color of monochrome display of which the luminance is to be improved.

2.6 Second Modification Example

Next, an image display apparatus that further improves monochrome display by adjusting the gray scale (transmittance of the liquid crystal) in the transparent subframe period in which the light guide plate 270 is transparent without the light source 27 of the backlight unit 25 turned on will be described as a second modification example of the second embodiment with reference to FIG. 3, FIG. 17, FIG. 22, and FIG. 23 on the assumption that an image of a single color that is the color of any one light source of the light sources 27r, 27g, and 27b in the backlight unit 25 is displayed (an image configured with a single color area and a transparent area is displayed).

The driving image data calculating unit 33 in the present modification example executes a single color image determination process of determining whether or not the input image is a single color image based on the input image data D1 and determining the color of the single color image in a case where the input image is a single color image. In a similar manner to the single color image determination process in the third modification example of the first embodiment, the single color image determination process includes steps (ST1) to (ST3) described above. Each time the input image data D1 of one frame is input, the driving image data calculating unit 33 executes steps (ST1) to (ST3) and then, executes a process (image data conversion process) of obtaining the driving image data D2 from the input image data D1.

Figure 22:
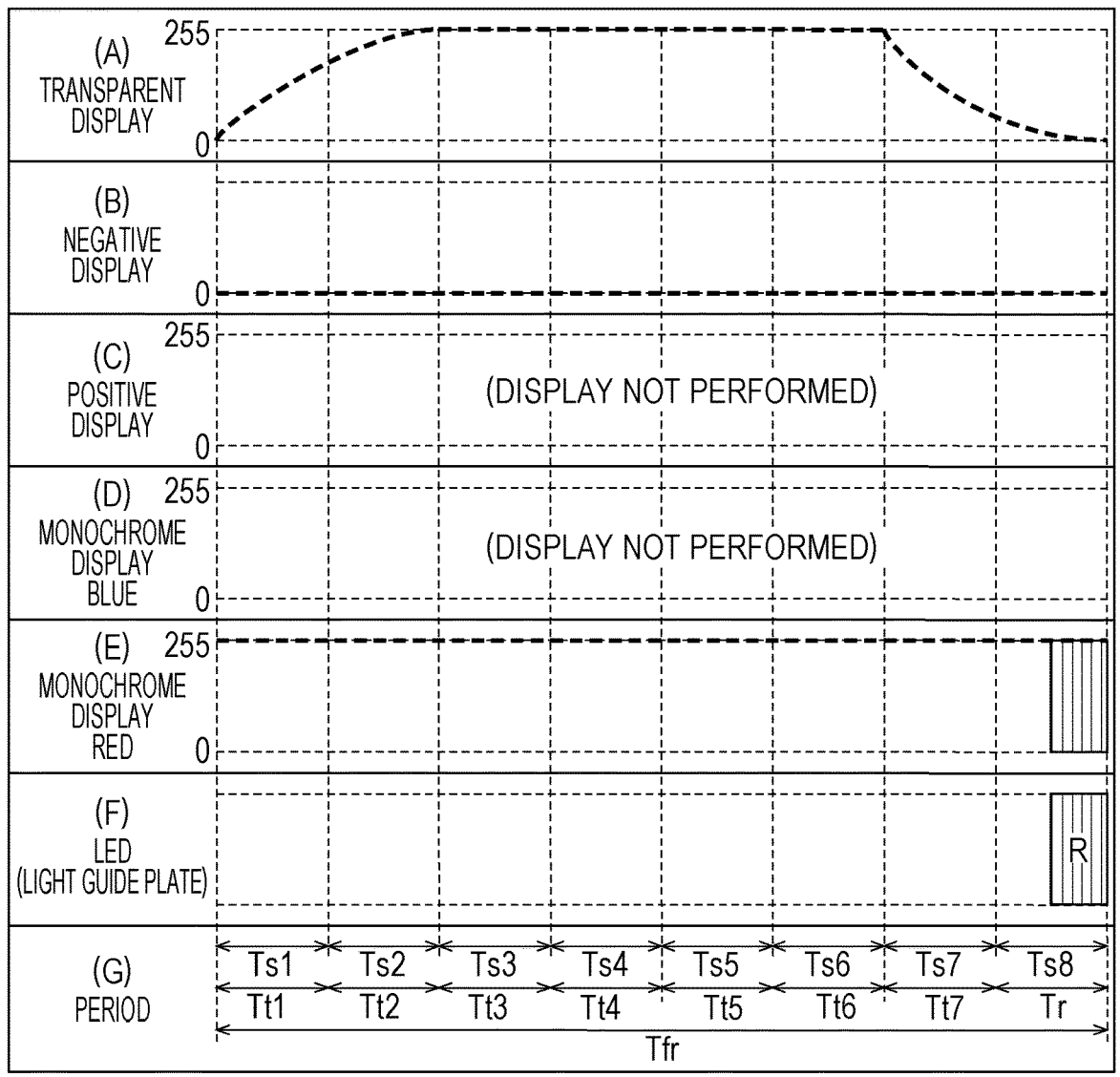
FIG. 22 is a timing chart and a waveform diagram (A to G) for describing a display operation of an image display apparatus according to a second modification example of the second embodiment.
Figure 23:
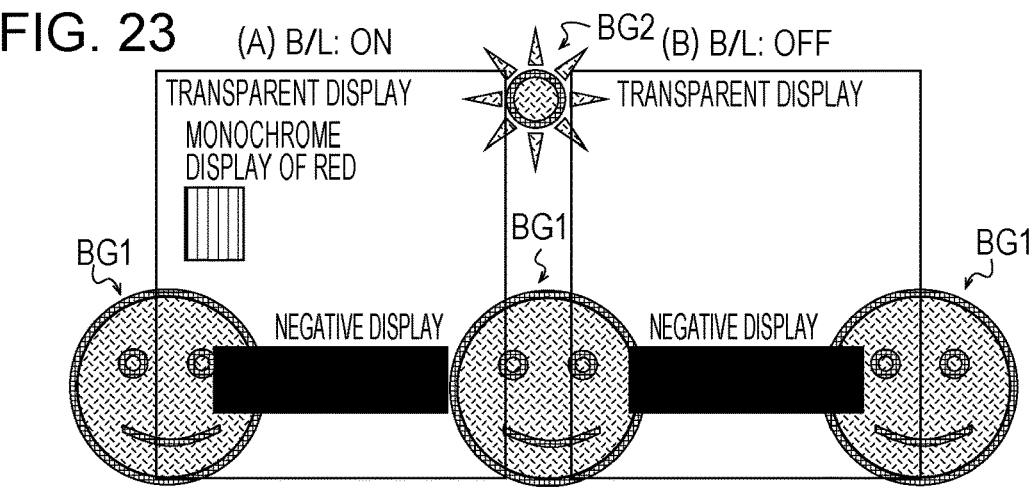
FIG. 23 is a schematic diagram (A and B) illustrating a display example produced by the image display apparatus according to the modification example of the second embodiment.

FIG. 22 is a timing chart and a waveform diagram for describing a display operation of the image display apparatus according to the present modification example. FIG. 23 is a schematic diagram illustrating a display example produced by the image display apparatus according to the present modification example. In the configuration of the image display apparatus according to the present modification example, the same or corresponding parts as the image display apparatus according to the second embodiment will be designated by the same reference signs (refer to FIG. 3 and FIG. 17). In addition, the image display apparatus 1b according to the present modification example has the B/L turn-on mode and the B/L turn-off mode. FIG. 22 illustrates the operation of the image display apparatus 1b according to the present modification example in the B/L turn-on mode. Hereinafter, a display operation in the B/L turn-on mode will be basically described. A display operation in the B/L turn-off mode is similar to that in the first and second embodiments and thus, will not be described (refer to FIG. 10 and part (B) of FIG. 23). Below, in a similar manner to the second embodiment, the color of the background light is regarded as white, and the image display apparatus 1b according to the present modification example is configured such that monochrome display is improved based on the intensity (luminance) between the color and the intensity of the background light indicated by the sensor signal SD. Thus, in the present modification example, a light detector that detects only the intensity of the background light may be used as the background light sensor 13. In addition, a display operation in a case where the input image data D1 represents a single color image of red will be described. A display operation in a case where the input image data D1 represents a single color image of another light source color, that is, any of blue, green, and white, is perceived from the following description and thus, will not be described.

FIG. 22 is a timing chart and a waveform diagram illustrating a display operation of the image display apparatus 1b in a case where it is determined that the input color is red in the single color image determination process, that is, in a case where the image represented by the input image data D1 is a single color image. As illustrated in part (F) of FIG. 22, in the B/L turn-on mode of the present modification example, in one frame period Tfr, only the red light source 27r is in the turn-on state in the second half of the red subframe period Tr as the eighth subframe period Ts8. In other periods (first to seventh subframe periods Ts1 to Ts7 and the like), the backlight unit 25 (all of the red, green, and blue light sources 27r, 27g, and 27b) is in the turn-off state. Therefore, the first to seventh subframe periods Ts1 to Ts7 are referred to as the first to seventh transparent subframe periods Tt1 to Tt7, respectively.

As illustrated in FIG. 17, the driving image data calculating unit 33 in the image display apparatus 1b receives the input image data D1 from its outside and the sensor signal SD from the background light sensor 13 and generates the driving image data D2 such that the luminance of monochrome display is improved using the background light by adjusting the gray scale (transmittance of the liquid crystal) in at least one transparent subframe period in the transparent display subframe period Tt (first to fourth transparent subframe periods Tt1 to Tt4) depending on the intensity of the background light based on the sensor signal SD. Specifically, the following display operation is performed.

That is, in a case where the image represented by the input image data D1 is a single color image of red, the gray scale is adjusted such that the transmittance of the liquid crystal is sufficiently increased in the first to seventh transparent subframe periods Tt1 to Tt7 as the first to seventh subframe periods Ts1 to Ts7 depending on the intensity of the background light indicated by the sensor signal SD in order to improve the luminance of the red area in the display image. In this case, the driving image data D2 is generated from the input image data D1 by the driving image data calculating unit 33 considering the intensity of the background light indicated by the sensor signal SD, such that an improvement in the luminosity of the pixels in the red area is prioritized. The liquid crystal panel 24 is driven by the panel drive circuit 22 using the driving image data D2. More specifically, the driving image data D2 is generated such that as the intensity of the background light increases, the gray scale of the pixels in the red area increases in at least one of the first to fourth transparent subframe periods Tt1 to Tt4. Accordingly, as the intensity of the background light increases, the total gray scale value (transmittance of the liquid crystal) of the pixels in the red area in the first to fourth transparent subframe periods Tt1 to Tt4, that is, the integral value or the average value of the gray scale values of the pixels in the periods Tt1 to Tt4, increases. For example, as illustrated in part (E) of FIG. 22, not only pixel data that indicates a gray scale value of 255 (maximum transmittance) is written into the liquid crystal panel 24 in the first half (scanning period Tsc) of the red subframe period Tr as the eighth subframe period Ts8, but also the pixel data that indicates the gray scale value of 255 (maximum transmittance) is written into the liquid crystal panel 24 in the first half (scanning period Tsc) of each of the first to seventh transparent subframe periods Tt1 to Tt7 as the first to seventh subframe periods Ts1 to Ts7. Since only the red light source 27r emits light among the light sources 27r, 27g, and 27b of the backlight unit 25, and the background color is white, such driving of the liquid crystal panel 24 does not cause color mixing.

In the present modification example, a display operation corresponding to the input color is performed in a similar manner to that described above even in a case where the input image is a single color image of blue or green (even in a case where it is determined in the single color image determination process that the input color is blue or green).

According to the present modification example, in a case where the input image is a single color image, an area (in the example in FIG. 22, the red area (red image)) having the input color in the display image may be brightly displayed by adjusting the gray scale of the area (in the example in FIG. 22, the red area) having the input color in the display image in at least one of the first to seventh transparent subframe periods Tt1 to Tt7 depending on the intensity of the background light such that the transmittance of the liquid crystal in a primary color subframe period (in the example in FIG. 22, the red subframe period Tr) corresponding to the input color that is the color of the single color image sufficiently increases. For example, depending on the intensity of the background light, the gray scale of the area having the input color is adjusted such that, for example, the transmittance of the liquid crystal in the area having the input color is maximized in the first to seventh transparent subframe periods Tt1 to Tt7. Accordingly, the area (in the example in FIG. 22, the red area) having the input color in the display image may be further brightly displayed.

Consequently, a good viewability of the area (in the example illustrated in FIG. 22, the red area) having the input color in the display image may be maintained even in an environment where the surrounding area is bright.

The present modification example may be corrected such that as in the first modification example of the second embodiment, the driving image data D2 is generated based on the background color determination process using the color (background color) indicated by the sensor signal SD. By such correction, deviation of the display color from its original chromaticity due to the background light may be reduced, and a similar effect to the present modification example may be achieved in a case where the background color indicated by the sensor signal SD is similar to the color of the single color image of which the luminance is to be improved.

3. Other Modification Examples

The present disclosure is not limited to each embodiment and the modification examples. Various modifications may be further carried out without departing from the scope of the present disclosure.

In each embodiment, while the display color subframe periods are arranged in the order of the blue subframe period Tb, the green subframe period Tg, the white subframe period Tw, and the blue subframe period Tb in the typical display subframe period Tn (refer to FIG. 5, part (F) of FIG. 8, and part (F) of FIG. 20), their arrangement order is not limited to the arrangement order in each embodiment. In addition, in each embodiment, while the typical display subframe period Tn is configured with the blue, green, and red subframe periods Tb, Tg, and Tr, the typical display subframe period Tn may be configured with a subframe period of another primary color and a common color subframe period instead.

In each embodiment and the modification examples, while the image display apparatus has the B/L turn-on mode and the B/L turn-off mode (refer to FIG. 8 to FIG. 10 and the like), the image display apparatus may be configured to perform an operation in only the B/L turn-on mode instead.

In each embodiment and the modification examples, while the backlight unit 25 as a light source section in the image display apparatus is an edge light type backlight unit including the light guide plate 270 in which light that is incident on the side surfaces of the light guide plate 270 from the light sources 27r, 27g, and 27b of LEDs or the like is emitted from the principal surface of the light guide plate 270 (FIG. 2), the light source section that may be used in the present disclosure is not limited to the backlight unit having such a configuration. For example, a planar lighting device that is configured such that a plurality of elements such as organic EL elements (OLEDs) are two-dimensionally arranged, and that is set to be in the transparent state when the plurality of elements are in the turn-off state may be used as the light source section.

While the image display apparatus according to each embodiment and the modification examples is described thus far, image display apparatuses according to various modification examples may be configured by any combination of the features of the image display apparatuses according to the embodiments and the modification examples without contradicting the properties of the features.

The present disclosure contains subject matter related to that disclosed in Japanese Priority Patent Application JP 2017-209395 filed in the Japan Patent Office on Oct. 30, 2017, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A field sequential type image display apparatus in which a plurality of subframe periods are included in each frame period, the apparatus comprising:
   a light source section;
   a light modulating unit as a display panel that transmits light from the light source section;
   a light source section drive circuit that drives the light source section;
   a light modulating unit drive circuit that controls a transmittance in the light modulating unit; and
   an image data converting unit that receives input image data and generates driving image data corresponding to the plurality of subframe periods from the input image data,
   wherein each frame period includes at least one transparent subframe period and at least one display color subframe period,
   the light source section is a planar lighting device that emits light from a principal surface and irradiates a rear surface of the light modulating unit with the light, and at a time of a turn-off state, the light source section is in a transparent state where light incident from the principal surface is transmitted,
   the light source section drive circuit drives the light source section such that the light source section is in the turn-off state in the transparent subframe period and is in a turn-on state in the display color subframe period,
   the image data converting unit generates transmittance control data as the driving image data based on the input image data, the transmittance control data causing the transmittance of light in an area of the light modulating unit for performing transparent display to be maximum in at least one transparent subframe period, causing the transmittance of light in an area of the light modulating unit for performing negative display to be minimum in the transparent subframe period and the display color subframe period, and causing the transmittance of light in an area of the light modulating unit for displaying a white or color image to a value corresponding to the image in the display color subframe period, and the light modulating unit drive circuit controls the transmittance in the light modulating unit by driving the light modulating unit based on the driving image data.

2. The image display apparatus according to claim 1, wherein each frame period includes a plurality of transparent subframe periods, and the plurality of subframe periods are arranged adjacent to each other.

3. The image display apparatus according to claim 1, wherein the light source section includes
  a plurality of light sources that emit light of a plurality of primary colors, and
  a light guide plate that receives light from the plurality of light sources on a side surface and irradiates the rear surface of the light modulating unit with the light from the principal surface, and
the light guide plate is in the transparent state when the plurality of light sources are in the turn-off state.

4. The image display apparatus according to claim 1, wherein each frame period includes a plurality of primary color subframe periods as the display color subframe period, the plurality of primary color subframe periods corresponding to a plurality of primary colors for color image display,
the light source section includes a plurality of light sources that emit light of the plurality of primary colors,
the light source section drive circuit drives the light source section to emit light of a corresponding color in each display color subframe period, and
the image data converting unit generates the transmittance control data as the driving image data based on the input image data, the transmittance control data causing the light modulating unit to display an image of a corresponding color in each primary color subframe period.

5. The image display apparatus according to claim 4, wherein the plurality of primary colors include blue, and
the light source section drive circuit drives the light source section such that the primary color subframe period corresponding to blue is immediately after the transparent subframe period in each frame period.

6. The image display apparatus according to claim 4, wherein each frame period includes the plurality of subframe periods including the plurality of primary color subframe periods and a common color subframe period as the display color subframe period, and
the light source section drive circuit drives the light source section such that only a light source of a corresponding color emits light in each primary color subframe period, and light sources of two or more colors among the plurality of light sources emit light in the common color subframe period.

7. The image display apparatus according to claim 4, wherein the plurality of primary colors are three primary colors for color image display, and
the light source section drive circuit drives the light source section such that only three primary color subframe periods corresponding to the three primary colors are included as the display color subframe period in each frame period.

8. The image display apparatus according to claim 4, wherein the light source section drive circuit drives the light source section such that in a case where an image represented by the input image data is a single color image, and a color of the single color image is a color corresponding to any one of the plurality of primary color subframe periods, the light source section is in the turn-off state in the subframe period other than the any one primary color subframe period in each frame period and is in the turn-on state in the any one primary color subframe period, and
the image data converting unit generates the driving image data from the input image data such that in a case where the image represented by the input image data is the single color image, and a color of the single color image is the color corresponding to any one of the plurality of primary color subframe periods, the transmittance of the area of the light modulating unit for performing transparent display is set to be maximum in the subframe period other than the any one primary color subframe period in each frame.

9. The image display apparatus according to claim 4, further comprising:
  a light detector that detects intensity of background light which is light from an outside directed toward the rear surface of the light modulating unit,
wherein the image data converting unit generates the driving image data from the input image data based on the intensity of the background light detected by the light detector such that in at least the one transparent subframe period, a transmittance of an area of the light modulating unit for displaying an image of any color based on the plurality of primary colors increases as the intensity of the background light increases.

10. The image display apparatus according to claim 9, wherein the image data converting unit generates the driving image data such that in a case where a pixel of a color corresponding to a primary color subframe period immediately after the transparent subframe period is included in an image represented by the input image data, a transmittance of an area of the light modulating unit for displaying an image of the corresponding color increases as the intensity of the background light increases in the transparent subframe period.

11. The image display apparatus according to claim 9, wherein the image data converting unit generates the driving image data such that in a case where a pixel of a color corresponding to a primary color subframe period immediately before the transparent subframe period is included in an image represented by the input image data, a transmittance of an area of the light modulating unit for displaying an image of the corresponding color increases as the intensity of the background light increases in the transparent subframe period.

12. The image display apparatus according to claim 4, further comprising:
  a light detector that detects intensity of background light which is light from an outside directed toward the rear surface of the light modulating unit,
wherein the light source section drive circuit drives the light source section such that in a case where an image represented by the input image data is a single color image, and a color of the single color image is a color corresponding to any one of the plurality of primary color subframe periods, the light source section is in the turn-off state in the subframe period other than the any one primary color subframe period in each frame period and is in the turn-on state in the any one primary color subframe period, and the image data converting unit generates the driving image data from the input image data such that in a case where the image represented by the input image data is the single color image, and the color of the single color image is the color corresponding to any one of the plurality of primary color subframe periods, a transmittance of an area of the light modulating unit for displaying an image of the corresponding color increases in at least one subframe period other than the any one primary color subframe period in each frame as the intensity of the background light increases.

13. An image display method for displaying an image in an image display apparatus including a light source section and a light modulating unit as a display panel transmitting light from the light source section, based on a field sequential type method in which a plurality of subframe periods are included in each frame period, the image display method comprising:

light source section driving of driving the light source section;

light modulating unit driving of controlling a transmittance in the light modulating unit; and image data converting of receiving input image data and generating driving image data corresponding to the plurality of subframe periods from the input image data, wherein each frame period includes at least one transparent subframe period and at least one display color subframe period, the light source section is a planar lighting device that emits light from a principal surface and irradiates a rear surface of the light modulating unit with the light, and at a time of a turn-off state, the light source section is in a transparent state where light incident from the principal surface is transmitted, in the light source section driving, the light source section is driven such that the light source section is in the turn-off state in the transparent subframe period and is in a turn-on state in the display color subframe period, in the image data converting, transmittance control data is generated as the driving image data based on the input image data, the transmittance control data causing the transmittance of light in an area of the light modulating unit for performing transparent display to be maximum in at least one transparent subframe period, causing the transmittance of light in an area of the light modulating unit for performing negative display to be minimum in the transparent subframe period and the display color subframe period, and causing the transmittance of light in an area of the light modulating unit for displaying a white or color image to a value corresponding to the image in the display color subframe period, and in the light modulating unit driving, the transmittance in the light modulating unit is controlled by driving the light modulating unit based on the driving image data.

14. The image display method according to claim 13, wherein each frame period includes a plurality of primary color subframe periods as the display color subframe period, the plurality of primary color subframe periods corresponding to a plurality of primary colors for color image display, the light source section includes a plurality of light sources that emit light of the plurality of primary colors, in the light source section driving, the light source section is driven to emit light of a corresponding color in each display color subframe period, and in the image data converting, the transmittance control data is generated as the driving image data based on the input image data, the transmittance control data causing the light modulating unit to display an image of a corresponding color in each primary color subframe period.

15. The image display method according to claim 14, wherein the image display apparatus further includes a light detector that detects intensity of background light which is light from an outside directed toward the rear surface of the light modulating unit, and in the image data converting, the driving image data is generated from the input image data based on the intensity of the background light detected by the light detector such that in at least the one transparent subframe period, a transmittance of an area of the light modulating unit for displaying a color image of any color based on the plurality of primary colors increases as the intensity of the background light increases.

16. The image display method according to claim 15, wherein in the image data converting, the driving image data is generated such that in a case where a pixel of a color corresponding to a primary color subframe period immediately after the transparent subframe period is included in an image represented by the input image data, a transmittance of an area of the light modulating unit for displaying an image of the corresponding color increases as the intensity of the background light increases in the transparent subframe period.

17. The image display method according to claim 15, wherein in the image data converting, the driving image data is generated such that in a case where a pixel of a color corresponding to a primary color subframe period immediately before the transparent subframe period is included in an image represented by the input image data, the transmittance of the area of the light modulating unit for displaying an image of the corresponding color is increased as the intensity of the background light is increased in the transparent subframe period.

* * * * *